US011327275B2

(12) United States Patent
Tseng et al.

(10) Patent No.: US 11,327,275 B2
(45) Date of Patent: May 10, 2022

(54) PHOTOGRAPHING LENS ASSEMBLY, IMAGE CAPTURING UNIT AND ELECTRONIC DEVICE

(71) Applicant: LARGAN PRECISION CO., LTD., Taichung (TW)

(72) Inventors: Yu-Tai Tseng, Taichung (TW); Tung-Yi Hsieh, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 42 days.

(21) Appl. No.: 16/745,229

(22) Filed: Jan. 16, 2020

(65) Prior Publication Data

US 2020/0150400 A1    May 14, 2020

Related U.S. Application Data

(63) Continuation of application No. 16/196,700, filed on Nov. 20, 2018, now Pat. No. 10,606,038, which is a
(Continued)

(30) Foreign Application Priority Data

Nov. 24, 2016    (TW) .................................. 105138726

(51) Int. Cl.
*G02B 9/60*    (2006.01)
*G02B 13/00*   (2006.01)

(52) U.S. Cl.
CPC ........... *G02B 9/60* (2013.01); *G02B 13/0045* (2013.01); *G02B 13/0065* (2013.01)

(58) Field of Classification Search
None
See application file for complete search history.

(56) References Cited

U.S. PATENT DOCUMENTS

| 3,862,796 A | 1/1975 | De Jager |
| 4,383,739 A | 5/1983 | Bogath |

(Continued)

FOREIGN PATENT DOCUMENTS

| CN | 101387739 A | 3/2009 |
| CN | 101387740 A | 3/2009 |

(Continued)

OTHER PUBLICATIONS

CN Office Action in Application No. 202010223689.X dated Mar. 24, 2021.

*Primary Examiner* — Darryl J Collins
(74) *Attorney, Agent, or Firm* — Maschoff Brennan

(57) ABSTRACT

A photographing lens assembly includes five lens elements, in order from an object side to an image side: a first lens element, a second lens element, a third lens element, a fourth lens element and a fifth lens element. The first lens element with positive refractive power has an object-side surface being convex in a paraxial region. The second lens element has an object-side surface being concave in a paraxial region. The third lens element has an object-side surface being convex in a paraxial region. The fourth lens element has an object-side surface being concave in a paraxial region, wherein two surfaces thereof are both aspheric. The fifth lens element has an object-side surface and an image-side surface being both aspheric. At least one surface of the lens elements has at least one inflection point.

12 Claims, 33 Drawing Sheets

Related U.S. Application Data continuation of application No. 15/459,576, filed on Mar. 15, 2017, now Pat. No. 10,175,458.

(56) References Cited

U.S. PATENT DOCUMENTS

| | | | |
|---|---|---|---|
| 4,772,106 A | 9/1988 | Ogata et al. | |
| 4,802,717 A | 2/1989 | Kebo | |
| 4,983,026 A | 1/1991 | Kudo et al. | |
| 5,144,475 A | 9/1992 | Hayashi | |
| 6,867,933 B2 | 3/2005 | Matsusaka | |
| 7,787,196 B2 | 8/2010 | Asami et al. | |
| 7,889,442 B2 | 2/2011 | Suzuki et al. | |
| 9,823,449 B1 | 11/2017 | Chung et al. | |
| 10,401,594 B2 | 9/2019 | Huang et al. | |
| 2012/0081595 A1* | 4/2012 | Uchida | G02B 13/009 348/340 |
| 2013/0182339 A1 | 7/2013 | Sekine et al. | |
| 2013/0208178 A1 | 8/2013 | Park | |
| 2014/0293453 A1 | 10/2014 | Ogino et al. | |
| 2015/0198791 A1* | 7/2015 | Kubota | G02B 13/0045 359/689 |
| 2015/0116569 A1 | 8/2015 | Mercado | |
| 2016/0062084 A1 | 3/2016 | Chen et al. | |
| 2016/0085059 A1 | 3/2016 | Mercado | |
| 2016/0238821 A1 | 8/2016 | Liao et al. | |
| 2016/0327773 A1 | 11/2016 | Choi et al. | |
| 2017/0269328 A1 | 9/2017 | Jhang et al. | |
| 2017/0269330 A1 | 9/2017 | Jhang et al. | |
| 2017/0269331 A1 | 9/2017 | Jhang et al. | |
| 2017/0353645 A1 | 12/2017 | Shabtay et al. | |
| 2019/0158750 A1 | 5/2019 | Kim et al. | |

FOREIGN PATENT DOCUMENTS

| | | |
|---|---|---|
| CN | 203759341 U | 8/2014 |
| CN | 105259636 A | 1/2016 |
| CN | 205049806 U | 2/2016 |
| CN | 105467563 A | 4/2016 |
| CN | 106154493 A | 11/2016 |
| CN | 106154494 A | 11/2016 |
| CN | 106154515 A | 11/2016 |
| CN | 106291883 A | 1/2017 |
| CN | 106707498 A | 5/2017 |
| JP | 1974-019088 B | 5/1974 |
| JP | S62251710 A | 11/1987 |
| JP | 1987-278519 A | 12/1987 |
| JP | H01-044907 A | 2/1989 |
| JP | 1993-264899 A | 10/1992 |
| JP | H06-194583 A | 7/1994 |
| JP | 2004-354572 A | 12/2004 |
| JP | 2005-010521 A | 1/2005 |
| JP | 2007-298572 A | 11/2007 |
| JP | 2008-281760 A | 11/2008 |
| JP | 2009-069369 A | 4/2009 |
| JP | 2009-086644 A | 4/2009 |
| TW | 201612579 A | 4/2016 |
| WO | 2018-058754 A1 | 4/2018 |

* cited by examiner

PHOTOGRAPHING LENS ASSEMBLY, IMAGE CAPTURING UNIT AND ELECTRONIC DEVICE

RELATED APPLICATIONS

This application is a continuation patent application of U.S. application Ser. No. 16/196,700, filed Nov. 20, 2018, which is a continuation patent application of U.S. application Ser. No. 15/459,576, filed Mar. 15, 2017, which claims priority to Taiwan Application 105138726, filed Nov. 24, 2016, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

In order to provide better user experience, the electronic device equipped with one or more optical systems has become the mainstream product in the market. For various applications, the optical systems are developed with various optical characteristics, and have been widely applied to different kinds of smart electronic devices, such as vehicle devices, image recognition systems, entertainment devices, sport devices and intelligent home assistance systems, for various requirements.

However, a lens element in a conventional optical system usually has spherical lens surfaces, such that the size of the conventional optical system is difficult to be reduced. Moreover, the field of view is unfavorable for capturing a detailed image of an object located from afar. Thus, there is a need to develop an optical system featuring compact size, telephoto effect and high image quality.

SUMMARY

According to one aspect of the present disclosure, a photographing lens assembly includes five lens elements, the five lens elements being, in order from an object side to an image side, a first lens element, a second lens element, a third lens element, a fourth lens element and a fifth lens element. The first lens element with positive refractive power has an object-side surface being convex in a paraxial region thereof. The second lens element has an object-side surface being concave in a paraxial region thereof. The third lens element has an object-side surface being convex in a paraxial region thereof. The fourth lens element has an object-side surface being concave in a paraxial region thereof, wherein the object-side surface and an image-side surface of the fourth lens element are both aspheric. The fifth lens element has an object-side surface and an image-side surface being both aspheric. At least one surface of the lens elements of the photographing lens assembly has at least one inflection point. When a sum of axial distances between each adjacent lens element of the photographing lens assembly is $\Sigma AT$, a central thickness of the first lens element is CT1, an axial distance between the image-side surface of the fifth lens element and an image surface is BL, an axial distance between the object-side surface of the first lens element and the image-side surface of the fifth lens element is TD, a maximum image height of the photographing lens assembly is ImgH, a focal length of the photographing lens assembly is f, the following conditions are satisfied:

$0<\Sigma AT/CT1<1.65;$ $0.65<BL/TD<2.60;$ and $0.10<ImgH/f<0.50.$

According to another aspect of the present disclosure, a photographing lens assembly includes five lens elements, the five lens elements being, in order from an object side to an image side, a first lens element, a second lens element, a third lens element, a fourth lens element and a fifth lens element. The first lens element with positive refractive power has an object-side surface being convex in a paraxial region thereof. The third lens element has an object-side surface being convex in a paraxial region thereof. The fourth lens element has an object-side surface and an image-side surface being both aspheric. The fifth lens element has an object-side surface and an image-side surface being both aspheric. At least one surface of the lens elements of the photographing lens assembly has at least one inflection point. When a sum of axial distances between each adjacent lens element of the photographing lens assembly is $\Sigma AT$, a central thickness of the first lens element is CT1, an axial distance between the image-side surface of the fifth lens element and an image surface is BL, an axial distance between the object-side surface of the first lens element and the image-side surface of the fifth lens element is TD, a maximum image height of the photographing lens assembly is ImgH, a focal length of the photographing lens assembly is f, a curvature radius of the object-side surface of the first lens element is R1, a curvature radius of the object-side surface of the fourth lens element is R7, the following conditions are satisfied:

$0<\Sigma AT/CT1<1.55;$ $0.70<BL/TD<2.20;$ $0.10<ImgH/f<0.50;$ and $-3.0<R1/R7<1.30.$ According to still another aspect of the present disclosure, an image capturing unit includes the aforementioned imaging optical lens assembly, an optical image stabilizer and an image sensor, wherein the image sensor is disposed on the image surface of the photographing lens assembly.

According to yet still another aspect of the present disclosure, an electronic device includes the aforementioned image capturing unit.

According to yet still another aspect of the present disclosure, a photographing lens assembly includes five lens elements, the five lens elements being, in order from an object side to an image side, a first lens element, a second lens element, a third lens element, a fourth lens element and a fifth lens element. The first lens element with positive refractive power has an object-side surface being convex in a paraxial region thereof. The second lens element has an object-side surface being concave in a paraxial region thereof. The third lens element has an object-side surface being convex in a paraxial region thereof. The fourth lens element has an object-side surface being concave in a paraxial region thereof, wherein the object-side surface and an image-side surface of the fourth lens element are both aspheric. The fifth lens element has an object-side surface and an image-side surface being both aspheric. At least one surface of the lens elements of the photographing lens assembly has at least one inflection point. When a sum of axial distances between each adjacent lens element of the photographing lens assembly is ΣAT, a central thickness of the first lens element is CT1, an axial distance between the image-side surface of the fifth lens element and an image surface is BL, an axial distance between the object-side surface of the first lens element and the image-side surface of the fifth lens element is TD, a maximum image height of the photographing lens assembly is ImgH, a focal length of the photographing lens assembly is f, a curvature radius of the object-side surface of the first lens element is R1, a curvature radius of the object-side surface of the third lens element is R5, the following conditions are satisfied:

0<Σ$AT/CT1$<1.75;

0.65<$BL/TD$<2.60;

0.10<Img$H/f$<0.50; and 0.55<$R1/R5$<2.0.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
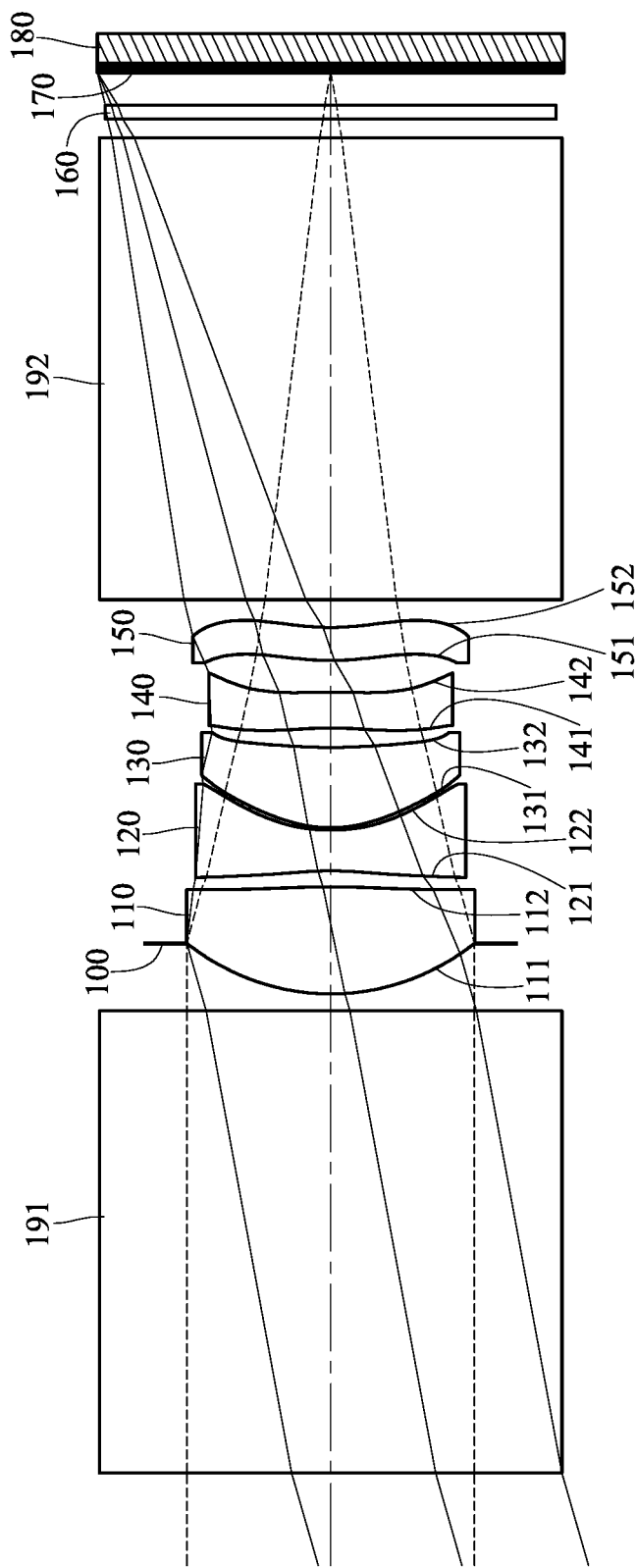
FIG. 1 is a schematic view of an image capturing unit according to the 1st embodiment of the present disclosure.

A photographing lens assembly includes five lens elements. The five lens elements are, in order from an object side to an image side, a first lens element, a second lens element, a third lens element, a fourth lens element and a fifth lens element.

The first lens element with positive refractive power has an object-side surface being convex in a paraxial region thereof. Therefore, it is favorable for providing sufficient light converging capability so as to obtain a telephoto effect;

furthermore, it is favorable for reducing a total track length of the photographing lens assembly so as to obtain better lens assembling.

The second lens element can have negative refractive power; therefore, it is favorable for correcting aberrations generated by the first lens element while correcting axial chromatic aberration, thereby converging light rays with different wavelengths on the same image surface. The second lens element can have an object-side surface being concave in a paraxial region thereof; therefore, it is favorable for obtaining a proper incident angle of the light at the surfaces of the second lens element so as to prevent excessive aberrations.

The third lens element can have positive refractive power; therefore, it is favorable for properly distributing the light converging capability between the first and the third lens elements while moving the principal point of the photographing lens assembly toward the image side to provide sufficient back focal length for a more flexible lens design. The third lens element has an object-side surface being convex in a paraxial region thereof; therefore, it is favorable for a better control in the traveling direction of light ray to reduce the size of the third lens element, thereby reducing the width of the photographing lens assembly. The third lens element can have an image-side surface being concave in a paraxial region thereof; therefore, it is favorable for controlling the traveling direction of light ray so as to prevent the diameter of the fourth lens element from becoming overly large.

The fourth lens element can have an object-side surface being concave in a paraxial region thereof; therefore, it is favorable for properly arranging the lens surface curvatures for the photographing lens assembly to maintain in a compact size with a tighter assembly of lens elements. An image-side surface of the fourth lens element can have at least one concave shape in an off-axial region thereof; therefore, it is favorable for reducing the effective radius of the surfaces of the fourth lens element so as to keep the photographing lens assembly compact.

The fifth lens element can have negative refractive power; therefore, it is favorable for correcting the Petzval surface so as to improve peripheral image quality. An object-side surface of the fifth lens element can have at least one concave shape in an off-axial region thereof; therefore, it is favorable for receiving light at the off-axial region to reduce the incident angle, thereby preventing total reflection at the object-side surface of the fifth lens element so as to eliminate stray light. The fifth lens element can have an image-side surface being concave in a paraxial region thereof, and the image-side surface of the fifth lens element can have at least one convex shape in an off-axial region thereof; therefore, it is favorable for improving the aberration correction at the off-axial region so as to maintain the photographing lens assembly in a compact size; furthermore, it is favorable for correcting the off-axial light ray to reduce field curvature and control the image height. Thus, the photographing lens assembly can be more flexible to design.

According to the present disclosure, at least one surface of the lens elements of the photographing lens assembly has at least one inflection point. In detail, among all object-side surfaces and all image-side surfaces of the first through the fifth lens elements, at least one of the surfaces has at least one inflection point. Therefore, it is favorable for correcting aberrations at the off-axial region so as to further improve peripheral image quality.

When a sum of axial distances between each adjacent lens element of the photographing lens assembly is $\Sigma AT$, a central thickness of the first lens element is CT1, the following condition is satisfied: $0<\Sigma AT/CT1<1.75$. Therefore, it is favorable for efficiently utilizing the space in the photographing lens assembly so as to meet the requirement of compact size; furthermore, it is also favorable for improving the light convergence at the object side. Preferably, the following condition can also be satisfied: $0<\Sigma AT/CT1<1.65$. More preferably, the following condition can also be satisfied: $0<\Sigma AT/CT1<1.55$.

When an axial distance between the image-side surface of the fifth lens element and an image surface is BL, an axial distance between the object-side surface of the first lens element and the image-side surface of the fifth lens element is TD, the following condition is satisfied: $0.65<BL/TD<2.60$. Therefore, it is favorable to obtain a proper total track length of the photographing lens assembly for better assembling and a sufficient back focal length for accommodating additional optical components. Preferably, the following condition can also be satisfied: $0.70<BL/TD<2.20$.

When a maximum image height of the photographing lens assembly (half of a diagonal length of an effective photosensitive area of an image sensor) is ImgH, a focal length of the photographing lens assembly is f, the following condition is satisfied: $0.10<ImgH/f<0.50$. Therefore, it is favorable for obtaining a proper field of view featuring telephoto effect, thus the photographing lens assembly is applicable to more kinds of applications. Preferably, the following condition can also be satisfied: $0.20<ImgH/f<0.35$.

When a curvature radius of the object-side surface of the first lens element is R1, a curvature radius of the object-side surface of the fourth lens element is R7, the following condition can be satisfied: $-3.0<R1/R7<1.30$. Therefore, it is favorable for a balance between the surface curvature of the first lens element and that of the fourth lens element so as to further improve the telephoto effect of the photographing lens assembly. Preferably, the following condition can also be satisfied: $-1.80<R1/R7<0.50$.

When the curvature radius of the object-side surface of the first lens element is R1, a curvature radius of the object-side surface of the third lens element is R5, the following condition can be satisfied: $0.55<R1/R5<2.0$. Therefore, it is favorable for converging light at the off-axial region toward an optical axis, thus the lens elements can be sturdily assembled in a compact space.

According to the present disclosure, the photographing lens assembly can further include an aperture stop. When an axial distance between the aperture stop and the image-side surface of the fifth lens element is SD, the axial distance between the object-side surface of the first lens element and the image-side surface of the fifth lens element is TD, the following condition can be satisfied: $0.60<SD/TD<0.94$. Therefore, it is favorable for controlling the imaging range and the incident angle of the light projecting onto the image surface so as to provide telephoto photographic functionality with high image brightness, simultaneously.

When the sum of axial distances between each adjacent lens element of the photographing lens assembly is $\Sigma AT$, a sum of central thicknesses of the lens elements of the photographing lens assembly is $\Sigma CT$, the following condition can be satisfied: $0.05<\Sigma AT/\Sigma CT<0.50$. Therefore, it is favorable for controlling the total track length of the photographing lens assembly and arranging sufficient space between each lens element so as to prevent interference during the lens assembling process.

When the central thickness of the first lens element is CT1, a central thickness of the second lens element is CT2, the following condition can be satisfied: $1.70<CT1/$ CT2<6.50. Therefore, it is favorable for balancing the thicknesses of the lens elements in order to efficiently utilize the space in the photographing lens assembly.

When an entrance pupil diameter of the photographing lens assembly is EPD, the maximum image height of the photographing lens assembly is ImgH, the following condition can be satisfied: 1.0<EPD/ImgH<1.80. Therefore, it is favorable for providing sufficient amount of incident light so as to increase the amount of light received per unit area of the image surface, thereby preventing vignetting.

When a curvature radius of the object-side surface of the second lens element is R3, a curvature radius of the image-side surface of the second lens element is R4, the following condition can be satisfied: −2.20<(R3+R4)/(R3−R4)<0.50. Therefore, the shape of the second lens element is favorable for a proper distribution of the marginal rays so as to reduce the effective radius of the image-side surface of the second lens element.

When an axial distance between the third lens element and the fourth lens element is T34, an axial distance between the fourth lens element and the fifth lens element is T45, the following condition can be satisfied: 0<T34/T45<3.0. Therefore, the axial distance between the fourth lens element and the fifth lens element is sufficient for accommodating the surface shapes of the fourth lens element and the fifth lens element, thus it is favorable for utilizing space efficiently while preventing interference between lens elements.

According to the present disclosure, the central thickness of the first lens element can be the maximum among all central thicknesses of the five lens elements of the photographing lens assembly. In detail, the central thickness of the first lens element can be larger than the central thicknesses of the second through the fifth lens elements. Therefore, it is favorable for increasing the structural strength at the object side so that the photographing lens assembly has higher resistance against external force, thus the stable quality of sturdiness can be obtained.

According to the present disclosure, at least three of the five lens elements of the photographing lens assembly each can have an Abbe number smaller than 30. In detail, each of the first through the fifth lens elements has an Abbe number, and at least three of the Abbe numbers can be smaller than 30. Therefore, the refractive power of the lens elements having smaller Abbe numbers can be relatively stronger, which is favorable for improving image quality.

According to the present disclosure, the photographing lens assembly can further include a reflector, and the reflector is favorable for the axial direction rearrangement of the optical axis so as to obtain more flexible lens design. The reflector can be, for example, a prism, which is favorable for extending the optical axis while preventing the total track length from overly long.

When a focal length of the first lens element is f1, a focal length of the third lens element is f3, the following condition can be satisfied: 0<f3/f1<1.10. Therefore, it is favorable for a proper refractive power distribution of the photographing lens assembly to obtain sufficient back focal length, and for enabling more types of applications.

When the focal length of the photographing lens assembly is f, a focal length of the second lens element is f2, the following condition can be satisfied: −5.50<f/f2<−2.50. Therefore, it is favorable for further correcting chromatic aberration of the photographing lens assembly and aberrations generated by the first lens element and the third lens element.

When the axial distance between the image-side surface of the fifth lens element and the image surface is BL, the maximum image height of the photographing lens assembly is ImgH, the following condition can be satisfied: 1.50<BL/ImgH<3.0. Therefore, it is favorable for providing sufficient back focal length and various lens design possibilities of the photographing lens assembly.

When a maximum effective radius of the object-side surface of the first lens element is Y11, a maximum effective radius of the image-side surface of the fifth lens element is Y52, the following condition can be satisfied: 0.95<Y11/Y52<1.30. Therefore, lens diameters of the photographing lens assembly are proper for maintaining a compact size thereof; furthermore, it is favorable for having a proper bearing surface area between lens elements with consistent image quality.

Figure 21:
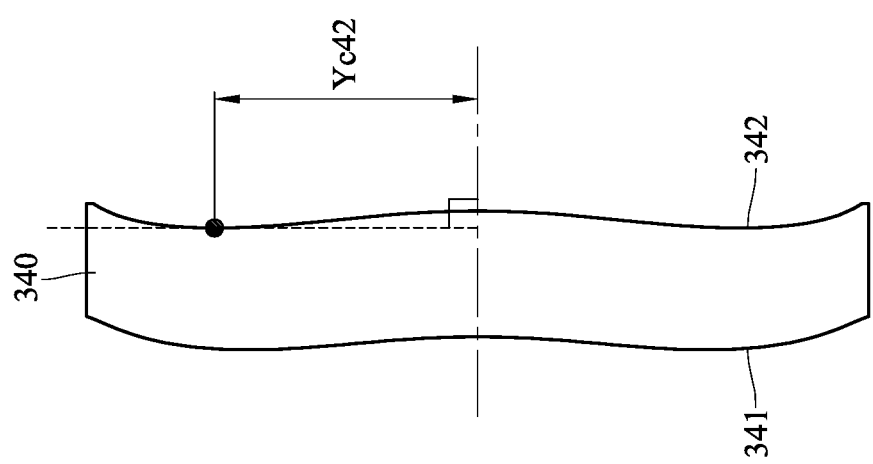
FIG. 21 is a schematic view of Yc42 according to the 3rd embodiment of the present disclosure.

When a vertical distance between a critical point on the image-side surface of the fourth lens element and the optical axis is Yc42, a central thickness of the fourth lens element is CT4, the following condition can be satisfied: 0.01<Yc42/CT4<5.0. Therefore, it is favorable for correcting field curvature and off-axial aberrations. A schematic view of Yc42 according to the 3rd embodiment of the present disclosure is shown in FIG. 21, wherein there is a concave critical point on the image-side surface of the fourth lens element. When the image-side surface of the fourth lens element has only one critical point, the vertical distance between the optical axis and the critical point is Yc42. When the image-side surface of the fourth lens element has multiple critical points, the vertical distance between the optical axis and the critical point closest to the optical axis may be Yc42.

According to the present disclosure, at least three of the five lens elements of the photographing lens assembly each can have at least one inflection point. In detail, among the first through the fifth lens elements, there can be at least three lens elements which have at least one inflection point on either the object-side surface, the image-side surface or both of the two surfaces of one of the at least three lens elements. Therefore, it is favorable for correcting aberrations, such as coma and astigmatism, at the off-axial region.

When the focal length of the photographing lens assembly is f, the curvature radius of the object-side surface of the third lens element is R5, the following condition can be satisfied: 0<R5/f<0.90. Therefore, the functionality of the third lens element is enhanced to improve the symmetry of the photographing lens assembly, thus it is favorable for correcting aberrations.

When the focal length of the photographing lens assembly is f, the focal length of the first lens element is f1, the focal length of the second lens element is f2, the focal length of the third lens element is f3, the following condition can be satisfied: 5.0<(f/f1)−(f/f2)+(f/f3)<20.0. Therefore, it is favorable for balancing light convergence and correction of chromatic aberration, thereby enhancing telephoto effect.

When an axial distance between the object-side surface of the first lens element and the image surface is TL, the focal length of the photographing lens assembly is f, the following condition can be satisfied: 0.95<TL/f<1.20. Therefore, it is favorable for maintaining a short total track length while satisfying the need of capturing highly detailed images in telephoto photography.

When an Abbe number of the first lens element is V1, an Abbe number of the second lens element is V2, an Abbe number of the third lens element is V3, an Abbe number of the fourth lens element is V4, an Abbe number of the fifth lens element is V5, the following condition can be satisfied:

1.0<(V2+V3+V4+V5)/V1<2.50. Therefore, it is favorable for improving aberration corrections while balancing chromatic aberration.

According to the present disclosure, the lens elements of the photographing lens assembly can be made of glass or plastic material. When the lens elements are made of glass material, the refractive power distribution of the photographing lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the photographing lens assembly can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing lens assembly on a corresponding image sensor can be flat or curved, particularly a concave curved surface facing towards the object side of the photographing lens assembly.

According to the present disclosure, the photographing lens assembly can include at least one stop, such as an aperture stop, a glare stop or a field stop. Said glare stop or said field stop is allocated for eliminating the stray light and thereby improving image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the above description of the present disclosure, the following specific embodiments are provided for further explanation.

1st Embodiment

Figure 1A:
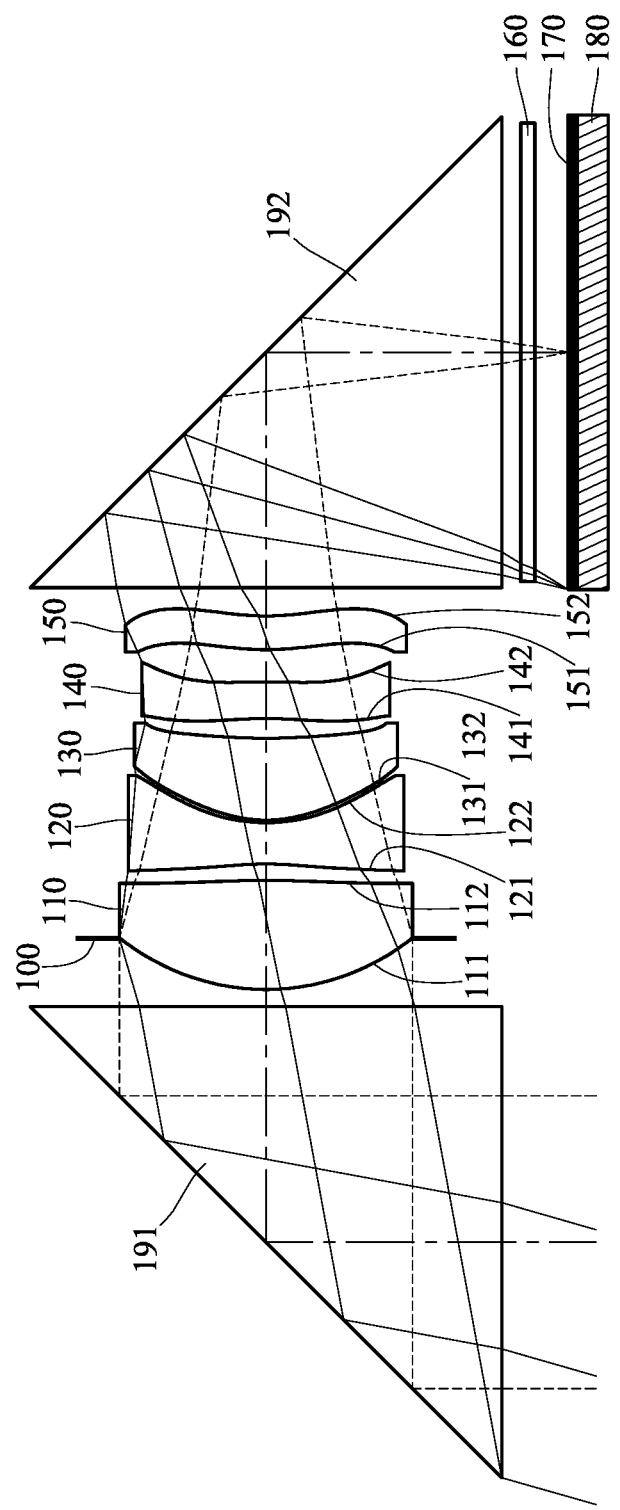
FIG. 1A is a schematic view of the image capturing unit with another configuration of prism according to the 1st embodiment of the present disclosure.
Figure 1B:
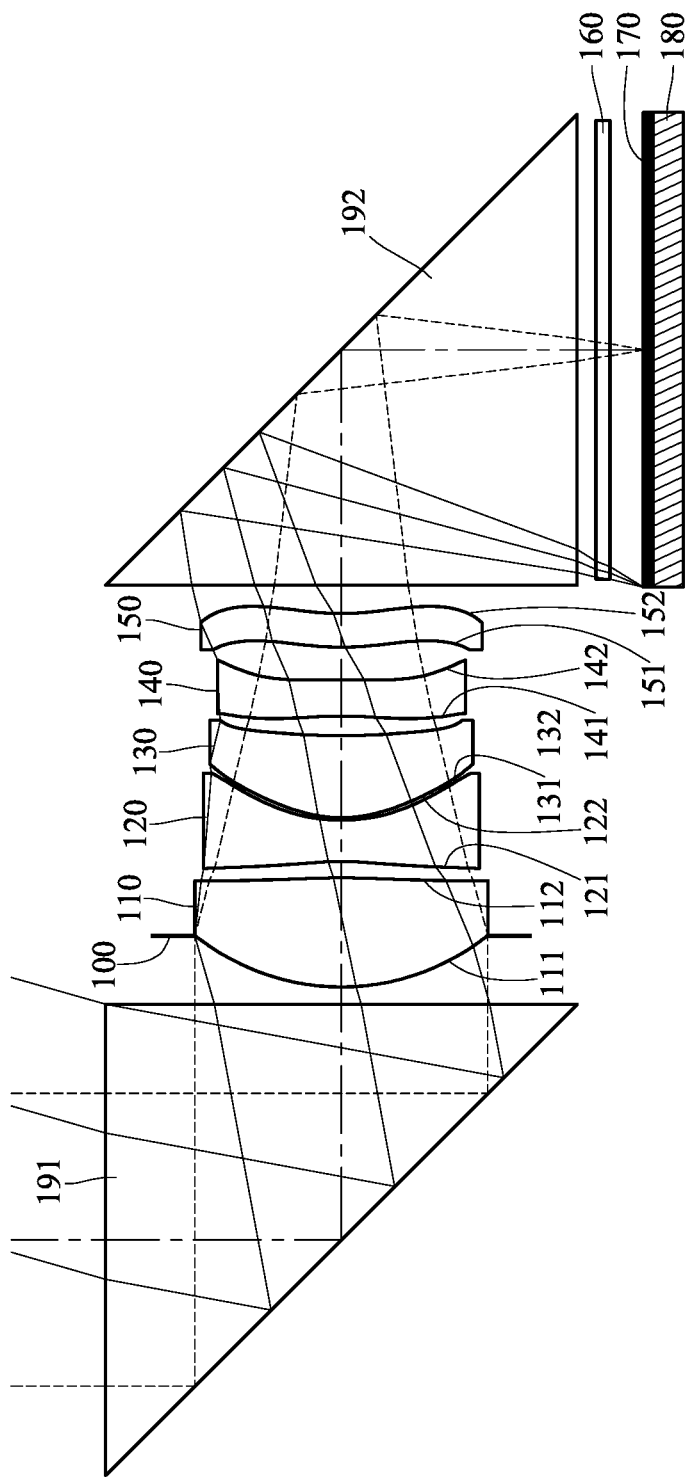
FIG. 1B is a schematic view of the image capturing unit with still another configuration of prism according to the 1st embodiment of the present disclosure.
Figure 2:
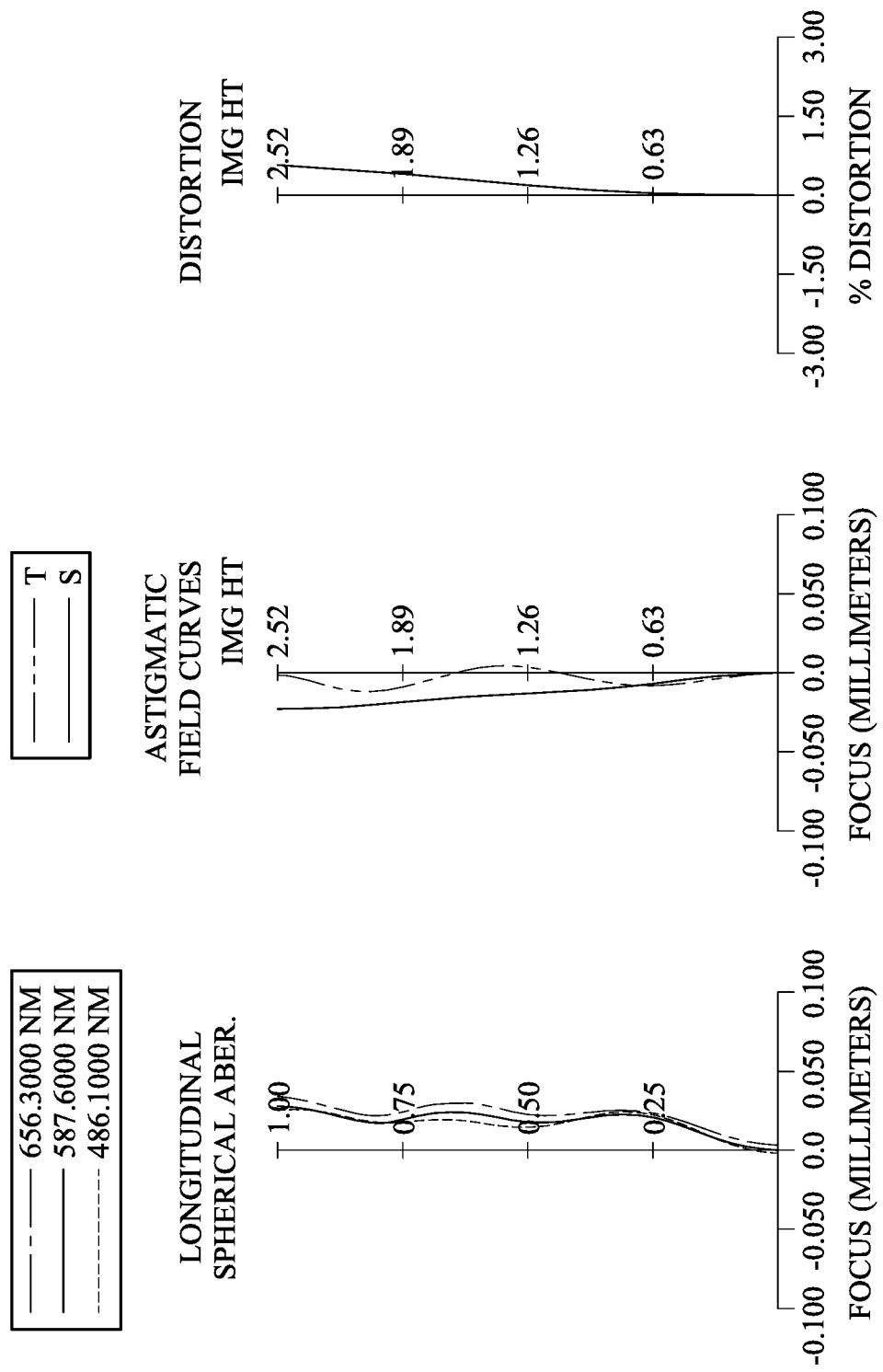
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 1A is a schematic view of the image capturing unit with another configuration of prism according to the 1st embodiment of the present disclosure. FIG. 1B is a schematic view of the image capturing unit with still another configuration of prism according to the 1st embodiment of the present disclosure. FIG. 2 shows, in order from left to right, spherical aberration curves, astigmatic field curves and a distortion curve of the image capturing unit according to the 1st embodiment. In FIG. 1 to FIG. 1B, the image capturing unit includes the photographing lens assembly (its reference numeral is omitted) of the present disclosure and an image sensor 180. The photographing lens assembly includes, in order from an object side to an image side, an object-side prism 191, an aperture stop 100, a first lens element 110, a second lens element 120, a third lens element 130, a fourth lens element 140, a fifth lens element 150, an image-side prism 192, an IR-cut filter 160 and an image surface 170. The photographing lens assembly includes five lens elements (110-150) with no additional lens element disposed between the first lens element 110 and the fifth lens element 150.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric. The image-side surface 112 of the first lens element 110 has at least one inflection point.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. Each of the object-side surface 121 and the image-side surface 122 of the second lens element 120 has at least one inflection point.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has at least one inflection point. The image-side surface 142 of the fourth lens element 140 has at least one concave shape in an off-axial region thereof. The image-side surface 142 of the fourth lens element 140 has at least one concave critical point in an off-axial region thereof.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has at least one concave shape in an off-axial region thereof. The image-side surface 152 of the fifth lens element 150 has at least one convex shape in an off-axial region thereof.

The IR-cut filter 160 is made of glass material and located between the fifth lens element 150 and the image surface 170, and will not affect the focal length of the photographing lens assembly. The image sensor 180 is disposed on or near the image surface 170 of the photographing lens assembly.

Both the object-side prism 191 and the image-side prism 192 are made of glass material. In FIG. 1, a configuration of the object-side prism 191 and the image-side prism 192 in the image capturing unit is for extending the optical axis. In FIG. 1A and FIG. 1B, a configuration of the object-side prism 191 and the image-side prism 192 in the image capturing unit is for changing the direction of the optical axis.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, and 14.

In the photographing lens assembly of the image capturing unit according to the 1st embodiment, when a focal length of the photographing lens assembly is f, an f-number of the photographing lens assembly is Fno, and half of a maximum field of view of the photographing lens assembly is HFOV, these parameters have the following values: f=8.70 millimeters (mm); Fno=2.80; and HFOV=16.0 degrees (deg).

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, the following condition is satisfied: (V2+V3+V4+V5)/V1=2.14.

When a central thickness of the first lens element 110 is CT1, a central thickness of the second lens element 120 is CT2, the following condition is satisfied: CT1/CT2=2.63.

When an axial distance between the third lens element 130 and the fourth lens element 140 is T34, an axial distance between the fourth lens element 140 and the fifth lens element 150 is T45, the following condition is satisfied: T34/T45=0.61.

When a sum of axial distances between each adjacent lens element of the photographing lens assembly is ΣAT, the central thickness of the first lens element 110 is CT1, the following condition is satisfied: ΣAT/CT1=0.65.

When the sum of axial distances between each adjacent lens element of the photographing lens assembly is ΣAT, a sum of central thicknesses of the lens elements of the photographing lens assembly is ΣCT, the following condition is satisfied: ΣAT/ΣCT=0.23.

When a curvature radius of the object-side surface 111 of the first lens element 110 is R1, a curvature radius of the object-side surface 131 of the third lens element 130 is R5, the following condition is satisfied: R1/R5=1.74.

When the curvature radius of the object-side surface 111 of the first lens element 110 is R1, a curvature radius of the object-side surface 141 of the fourth lens element 140 is R7, the following condition is satisfied: R1/R7=−0.57.

When the focal length of the photographing lens assembly is f, the curvature radius of the object-side surface 131 of the third lens element 130 is R5, the following condition is satisfied: R5/f=0.16.

When a curvature radius of the object-side surface 121 of the second lens element 120 is R3, a curvature radius of the image-side surface 122 of the second lens element 120 is R4, the following condition is satisfied: (R3+R4)/(R3−R4)=0.26.

When the focal length of the photographing lens assembly is f, a focal length of the second lens element 120 is f2, the following condition is satisfied: f/f2=−4.67.

When a focal length of the first lens element 110 is f1, a focal length of the third lens element 130 is f3, the following condition is satisfied: f3/f1=0.70.

When the focal length of the photographing lens assembly is f, the focal length of the first lens element 110 is f1, the focal length of the second lens element 120 is f2, the focal length of the third lens element 130 is f3, the following condition is satisfied: (f/f1)−(f/f2)+(f/f3)=10.51.

When an axial distance between the image-side surface 152 of the fifth lens element 150 and the image surface 170 is BL, a maximum image height of the photographing lens assembly is ImgH, the following condition is satisfied: BL/ImgH=2.38.

When the axial distance between the image-side surface 152 of the fifth lens element 150 and the image surface 170 is BL, an axial distance between the object-side surface 111 of the first lens element 110 and the image-side surface 152 of the fifth lens element 150 is TD, the following condition is satisfied: BL/TD=1.51.

When an axial distance between the aperture stop 100 and the image-side surface 152 of the fifth lens element 150 is SD, the axial distance between the object-side surface 111 of the first lens element 110 and the image-side surface 152 of the fifth lens element 150 is TD, the following condition is satisfied: SD/TD=0.86.

When the focal length of the photographing lens assembly is f, the maximum image height of the photographing lens assembly is ImgH, the following condition is satisfied: ImgH/f=0.29.

When an entrance pupil diameter of the photographing lens assembly is EPD, the maximum image height of the photographing lens assembly is ImgH, the following condition is satisfied: EPD/ImgH=1.23.

When an axial distance between the object-side surface 111 of the first lens element 110 and the image surface 170 is TL, the focal length of the photographing lens assembly is f, the following condition is satisfied: TL/f=1.15.

When a maximum effective radius of the object-side surface 111 of the first lens element 110 is Y11, a maximum effective radius of the image-side surface 152 of the fifth lens element 150 is Y52, the following condition is satisfied: Y11/Y52=1.04.

When a vertical distance between a critical point on the image-side surface 142 of the fourth lens element 140 and an optical axis is Yc42, a central thickness of the fourth lens element 140 is CT4, the following condition is satisfied: Yc42/CT4=1.02.

The detailed optical data of the 1st embodiment are shown in Table 1 and the aspheric surface data are shown in Table 2 below.

TABLE 1

1st Embodiment
f = 8.70 mm, Fno = 2.80, HFOV = 16.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Prism | Plano | 5.000 | Glass | 1.517 | 64.2 | — |
| 2 | | Plano | 0.728 | | | | |
| 3 | Ape. Stop | Plano | −0.544 | | | | |

TABLE 1-continued

1st Embodiment
f = 8.70 mm, Fno = 2.80, HFOV = 16.0 deg.

| Surface # | | Curvature Radius | | Thickness | Material | Index | Abbe # | Focal Length |
|---|---|---|---|---|---|---|---|---|
| 4 | Lens 1 | 2.422 | (ASP) | 1.159 | Plastic | 1.545 | 56.0 | 3.61 |
| 5 | | -8.705 | (ASP) | 0.173 | | | | |
| 6 | Lens 2 | -3.316 | (ASP) | 0.440 | Plastic | 1.639 | 23.3 | -1.86 |
| 7 | | 1.952 | (ASP) | 0.026 | | | | |
| 8 | Lens 3 | 1.393 | (ASP) | 0.870 | Plastic | 1.660 | 20.4 | 2.54 |
| 9 | | 6.250 | (ASP) | 0.209 | | | | |
| 10 | Lens 4 | -4.219 | (ASP) | 0.387 | Plastic | 1.660 | 20.4 | -10.27 |
| 11 | | -11.583 | (ASP) | 0.344 | | | | |
| 12 | Lens 5 | 2.703 | (ASP) | 0.358 | Plastic | 1.544 | 56.0 | -421.78 |
| 13 | | 2.547 | (ASP) | 0.300 | | | | |
| 14 | Prism | Plano | | 5.000 | Glass | 1.517 | 64.2 | — |
| 15 | | Plano | | 0.200 | | | | |
| 16 | IR-cut filter | Plano | | 0.150 | Glass | 1.517 | 64.2 | — |
| 17 | | Plano | | 0.351 | | | | |
| 18 | Image | Plano | | — | | | | |

Note:
Reference wavelength is 587.6 nm (d-line).
At least one of the object-side prism 191 and the image-side prism 192 has a reflective surface.
An effective radius of an object-side surface of the object-side prism 191 (Surface 1) is 2.500 mm.

TABLE 2

| Aspheric Coefficients | | | | | |
|---|---|---|---|---|---|
| Surface # | 4 | 5 | 6 | 7 | 8 |
| k= | 1.7277E-01 | 5.5236E+00 | 7.7056E-01 | -6.2812E-01 | -4.2910E-01 |
| A4= | -7.5993E-03 | 2.8237E-02 | 2.0711E-01 | 8.3297E-02 | -1.2554E-01 |
| A6= | 5.7350E-03 | 5.5150E-02 | -1.5041E-01 | -9.5206E-02 | 5.4731E-02 |
| A8= | -4.6931E-03 | -1.0651E-01 | 3.6322E-02 | 2.6670E-02 | -5.7145E-03 |
| A10= | 1.6438E-03 | 7.5159E-02 | 1.9783E-02 | 8.4069E-03 | -3.4473E-02 |
| A12= | -2.1852E-04 | -2.4002E-02 | -1.3318E-02 | -4.4653E-03 | 2.6884E-02 |
| A14= | — | 2.8900E-03 | 2.1240E-03 | -5.0502E-05 | -5.8470E-03 |
| Surface # | 9 | 10 | 11 | 12 | 13 |
| k= | 9.8749E+00 | 3.7447E+00 | -9.0000E+01 | -1.7624E+01 | -1.9305E+01 |
| A4= | -3.5765E-02 | 1.6005E-01 | 1.2604E-01 | -7.0369E-02 | -4.1117E-02 |
| A6= | -2.9067E-02 | -6.3326E-02 | 5.1947E-02 | 2.6102E-02 | -4.1814E-02 |
| A8= | 1.3443E-01 | 6.6987E-02 | -1.3381E-01 | -5.4556E-02 | 4.2887E-02 |
| A10= | -1.6086E-01 | -9.9266E-02 | 1.0893E-01 | 5.5006E-02 | -2.4027E-02 |
| A12= | 8.3122E-02 | 6.5321E-02 | -4.4459E-02 | -2.6435E-02 | 6.8681E-03 |
| A14= | -1.3921E-02 | -1.5050E-02 | 7.0162E-03 | 4.7166E-03 | -9.0605E-04 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
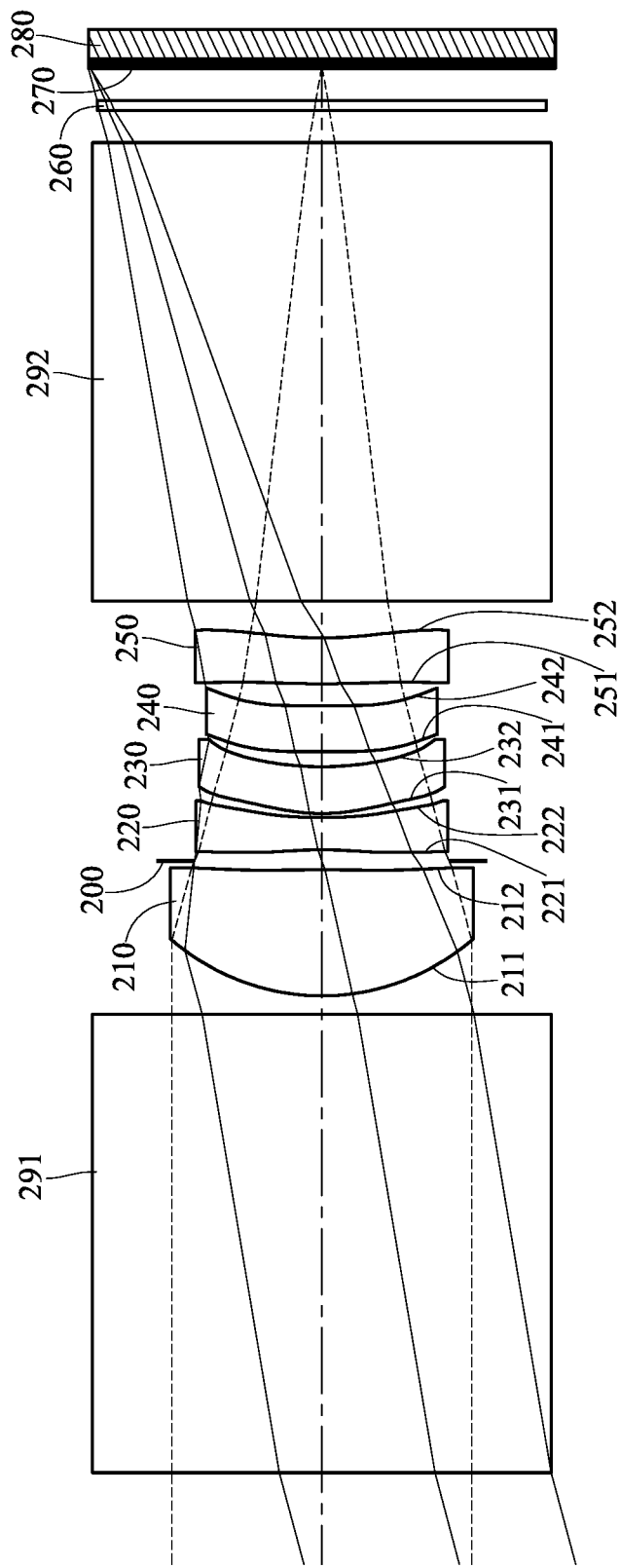
FIG. 3 is a schematic view of an image capturing unit according to the 2nd embodiment of the present disclosure.
Figure 3A:
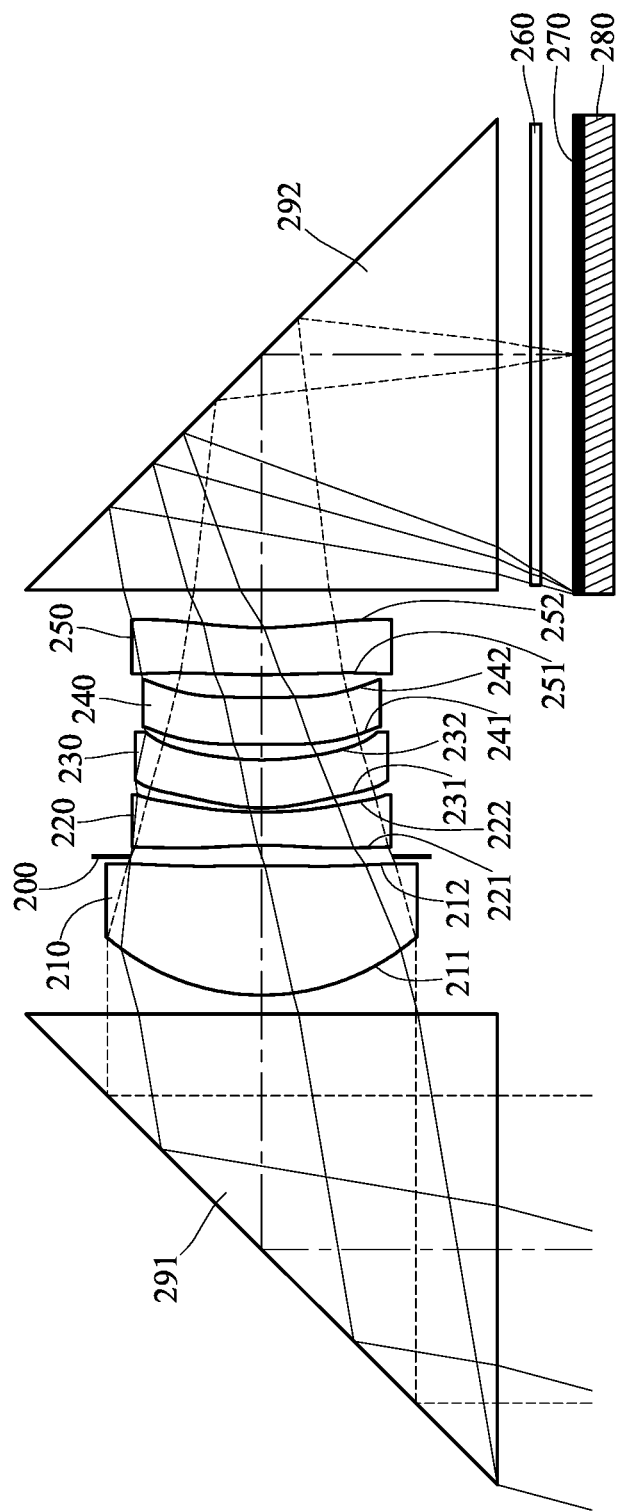
FIG. 3A is a schematic view of the image capturing unit with another configuration of prism according to the 2nd embodiment of the present disclosure.
Figure 3B:
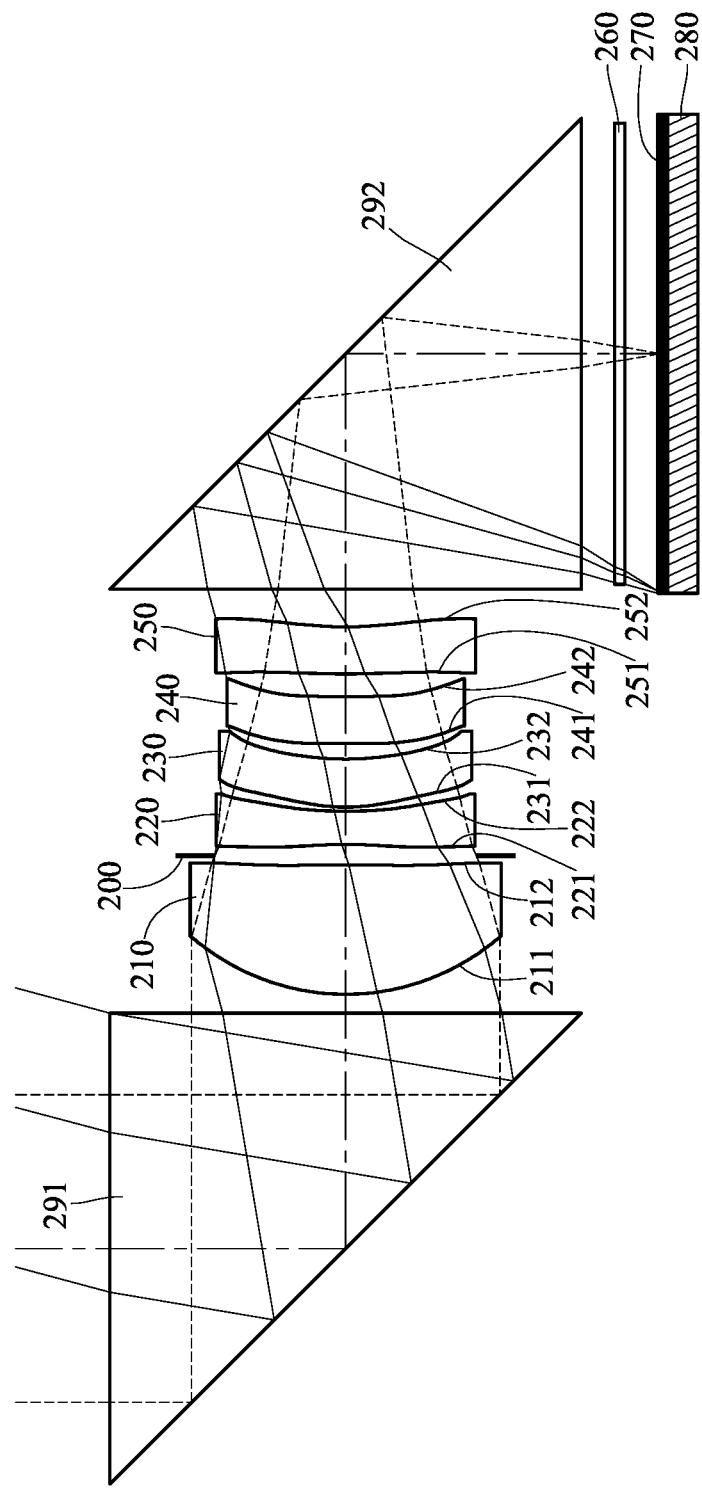
FIG. 3B is a schematic view of the image capturing unit with still another configuration of prism according to the 2nd embodiment of the present disclosure.
Figure 4:
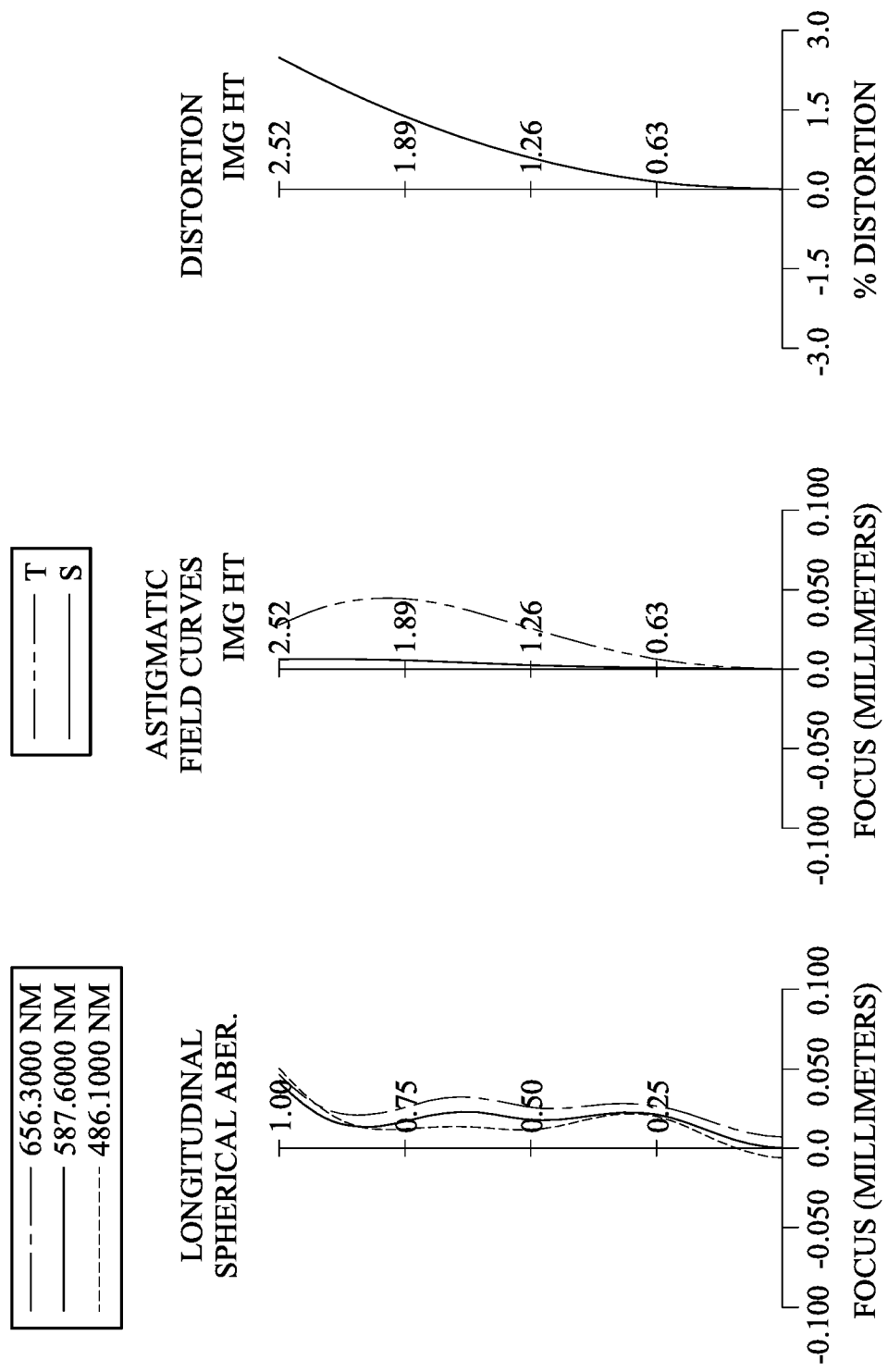
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 3A is a schematic view of the image capturing unit with another configuration of prism according to the 2nd embodiment of the present disclosure. FIG. 3B is a schematic view of the image capturing unit with still another configuration of prism according to the 2nd embodiment of the present disclosure. FIG. 4 shows, in order from left to right, spherical aberration curves, astigmatic field curves and a distortion curve of the image capturing unit according to the 2nd embodiment. In FIG. 3 to FIG. 3B, the image capturing unit includes the photographing lens assembly (its reference numeral is omitted) of the present disclosure and an image sensor 280. The photographing lens assembly includes, in order from an object side to an image side, an object-side prism 291, a first lens element 210, an aperture stop 200, a second lens element 220, a third lens element 230, a fourth lens element 240, a fifth lens element 250, an image-side prism 292, an IR-cut filter 260 and an image surface 270. The photographing lens assembly includes five lens elements (210-250) with no additional lens element disposed between the first lens element 210 and the fifth lens element 250.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric. The image-side surface 212 of the first lens element 210 has at least one inflection point.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one inflection point.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has at least one inflection point. The image-side surface 242 of the fourth lens element 240 has at least one concave shape in an off-axial region thereof. The image-side surface 242 of the fourth lens element 240 has at least one concave critical point in an off-axial region thereof.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has at least one concave shape in an off-axial region thereof. The image-side surface 252 of the fifth lens element 250 has at least one convex shape in an off-axial region thereof.

The IR-cut filter 260 is made of glass material and located between the fifth lens element 250 and the image surface 270, and will not affect the focal length of the photographing lens assembly. The image sensor 280 is disposed on or near the image surface 270 of the photographing lens assembly.

Both the object-side prism 291 and the image-side prism 292 are made of glass material. In FIG. 3, a configuration of the object-side prism 291 and the image-side prism 292 in the image capturing unit is for extending the optical axis. In FIG. 3A and FIG. 3B, a configuration of the object-side prism 291 and the image-side prism 292 in the image capturing unit is for changing the direction of the optical axis.

The detailed optical data of the 2nd embodiment are shown in Table 3 and the aspheric surface data are shown in Table 4 below.

TABLE 3

2nd Embodiment
f = 9.15 mm, Fno = 2.80, HFOV = 15.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Prism | Plano | 5.000 | Glass | 1.559 | 40.4 | — |
| 2 | | Plano | 0.200 | | | | |
| 3 | Lens 1 | 2.470 (ASP) | 1.375 | Plastic | 1.545 | 56.0 | 4.04 |
| 4 | | −16.381 (ASP) | 0.096 | | | | |
| 5 | Ape. Stop | Plano | 0.122 | | | | |
| 6 | Lens 2 | −3.784 (ASP) | 0.350 | Plastic | 1.639 | 23.3 | −3.41 |
| 7 | | 5.310 (ASP) | 0.045 | | | | |
| 8 | Lens 3 | 1.987 (ASP) | 0.510 | Plastic | 1.660 | 20.4 | 6.49 |
| 9 | | 3.329 (ASP) | 0.164 | | | | |
| 10 | Lens 4 | 169.384 (ASP) | 0.500 | Plastic | 1.671 | 19.5 | 246.02 |
| 11 | | −6409.622 (ASP) | 0.240 | | | | |
| 12 | Lens 5 | 9.972 (ASP) | 0.500 | Plastic | 1.584 | 28.2 | −11.31 |
| 13 | | 3.901 (ASP) | 0.400 | | | | |
| 14 | Prism | Plano | 5.000 | Glass | 1.559 | 40.4 | — |
| 15 | | Plano | 0.350 | | | | |
| 16 | IR-cut filter | Plano | 0.110 | Glass | 1.517 | 64.2 | — |
| 17 | | Plano | 0.350 | | | | |
| 18 | Image | Plano | — | | | | |

Note:
Reference wavelength is 587.6 nm (d-line).
At least one of the object-side prism 291 and the image-side prism 292 has a reflective surface.
An effective radius of an object-side surface of the object-side prism 291 (Surface 1) is 2.500 mm.

TABLE 4

Aspheric Coefficients

| Surface # | 3 | 4 | 6 | 7 | 8 |
|---|---|---|---|---|---|
| k= | 2.3007E−01 | −1.2832E+01 | −1.8587E+00 | −4.9766E−01 | −6.7275E−01 |
| A4= | −6.3911E−03 | 2.9921E−02 | 2.1187E−01 | 8.1243E−02 | −1.3478E−01 |
| A6= | 6.1418E−03 | 5.5882E−02 | −1.5308E−01 | −9.7350E−02 | 5.0827E−02 |
| A8= | −4.8805E−03 | −1.0639E−01 | 3.4717E−02 | 2.2222E−02 | 1.7035E−03 |
| A10= | 1.6399E−03 | 7.4521E−02 | 1.9417E−02 | 9.9607E−03 | −3.2226E−02 |
| A12= | −2.2872E−04 | −2.4436E−02 | −1.3341E−02 | −3.7761E−03 | 2.6761E−02 |
| A14= | | 3.0842E−03 | 2.2774E−03 | 6.1958E−04 | −5.7660E−03 |

| Surface # | 9 | 10 | 11 | 12 | 13 |
|---|---|---|---|---|---|
| k= | 4.8902E+00 | −9.0000E+01 | −9.0000E+01 | −1.6271E+01 | −1.9802E+01 |
| A4= | −2.7609E−02 | 1.3054E−01 | 1.1649E−01 | −4.8428E−02 | −3.2406E−02 |
| A6= | −3.1918E−02 | −5.0160E−02 | 4.2535E−02 | 8.5686E−02 | 2.7881E−02 |
| A8= | 1.2981E−01 | 6.8676E−02 | −1.2998E−01 | −1.5516E−01 | −4.7107E−02 |
| A10= | −1.5861E−01 | −1.0117E−01 | 1.0900E−01 | 1.3863E−01 | 3.9528E−02 |
| A12= | 8.5551E−02 | 6.1810E−02 | −4.4954E−02 | −5.9815E−02 | −1.6127E−02 |
| A14= | −1.6072E−02 | −1.3613E−02 | 6.8919E−03 | 1.0260E−02 | 2.5976E−03 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 9.15 | f/f2 | −2.68 |
| Fno | 2.80 | f3/f1 | 1.60 |
| HFOV [deg.] | 15.0 | (f/f1) − (f/f2) + (f/f3) | 6.36 |
| (V2 + V3 + V4 + V5)/V1 | 1.63 | BL/ImgH | 2.47 |
| CT1/CT2 | 3.93 | BL/TD | 1.59 |
| T34/T45 | 0.68 | SD/TD | 0.62 |
| ΣAT/CT1 | 0.49 | ImgH/f | 0.28 |
| ΣAT/ΣCT | 0.21 | EPD/ImgH | 1.30 |
| R1/R5 | 1.24 | TL/f | 1.11 |
| R1/R7 | 0.01 | Y11/Y52 | 1.20 |
| R5/f | 0.22 | Yc42/CT4 | 0.03 |
| (R3 + R4)/(R3 − R4) | −0.17 | — | — |

3rd Embodiment

Figure 5:
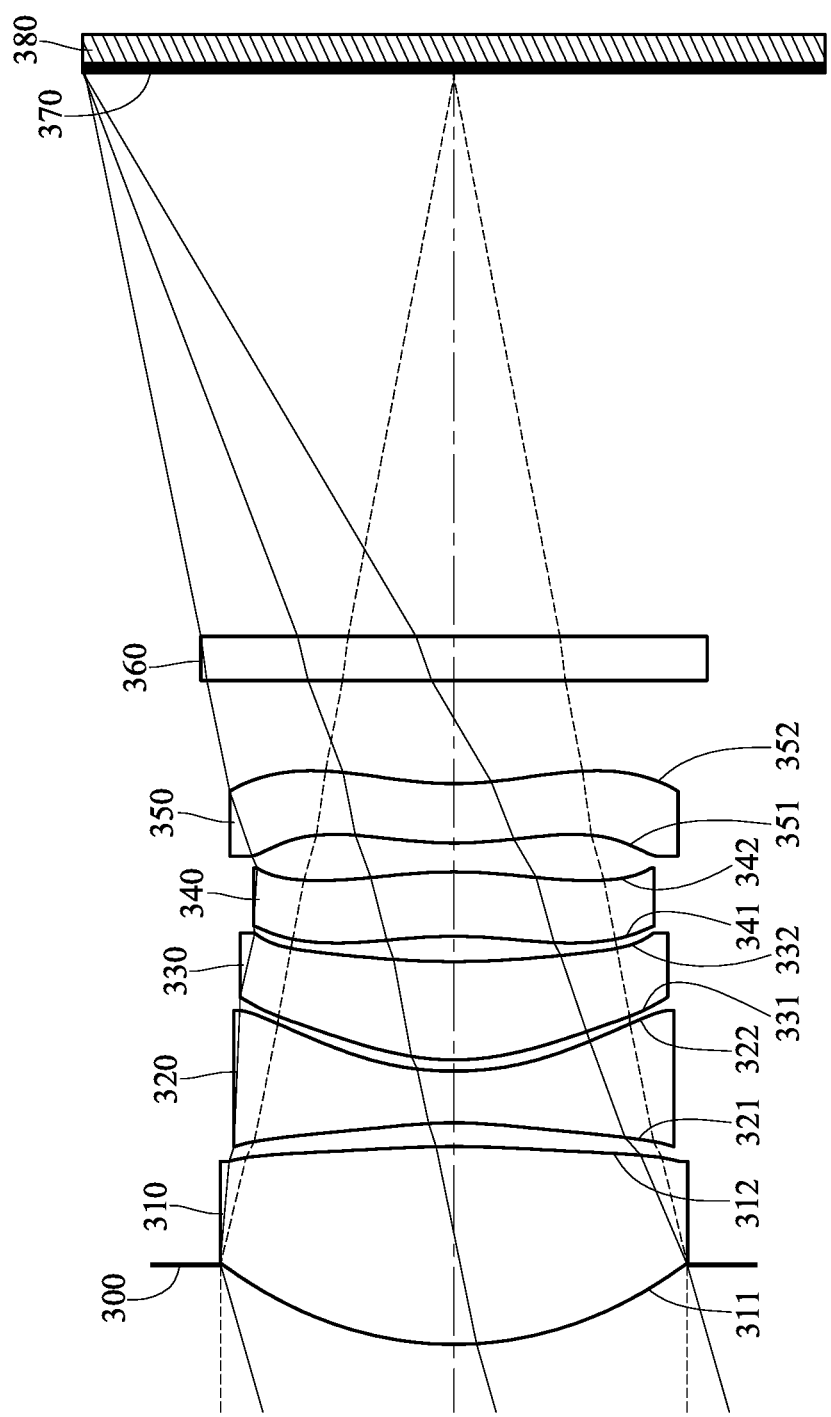
FIG. 5 is a schematic view of an image capturing unit according to the 3rd embodiment of the present disclosure.
Figure 6:
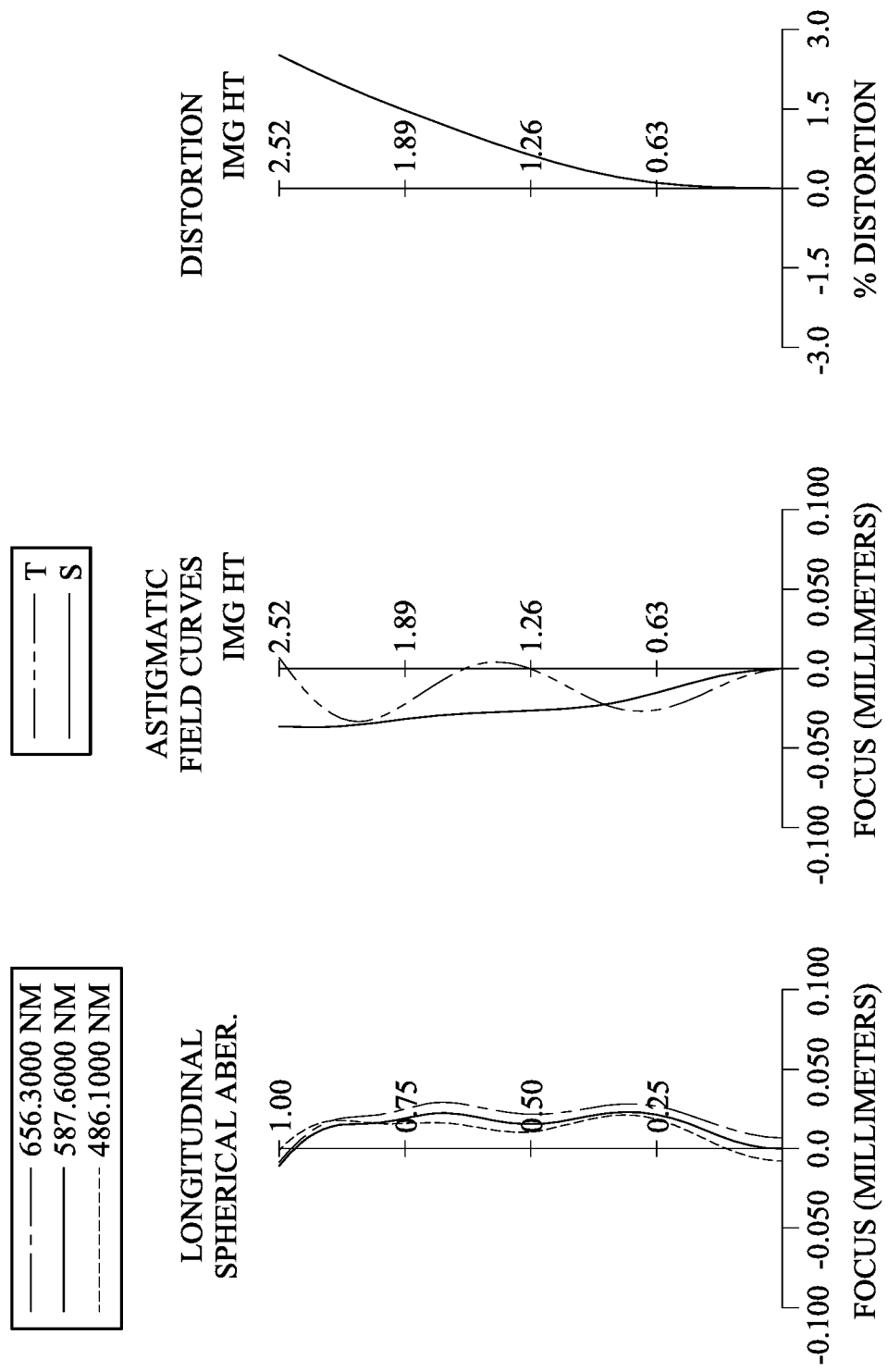
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 380. The photographing lens assembly includes, in order from an object side to an image side, an aperture stop 300, a first lens element 310, a second lens element 320, a third lens element 330, a fourth lens element 340, a fifth lens element 350, an IR-cut filter 360 and an image surface 370. The photographing lens assembly includes five lens elements (310-350) with no additional lens element disposed between the first lens element 310 and the fifth lens element 350.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The image-side surface 312 of the first lens element 310 has at least one inflection point.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. Both the object-side surface 321 and the image-side surface 322 of the second lens element 320 have at least one inflection point.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one inflection point.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point. The image-side surface 342 of the fourth lens element 340 has at least one concave shape in an off-axial region thereof. The image-side surface 342 of the fourth lens element 340 has at least one concave critical point in an off-axial region thereof.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has at least one concave shape in an off-axial region thereof. The image-side surface 352 of the fifth lens element 350 has at least one convex shape in an off-axial region thereof.

The IR-cut filter 360 is made of glass material and located between the fifth lens element 350 and the image surface 370, and will not affect the focal length of the photographing lens assembly. The image sensor 380 is disposed on or near the image surface 370 of the photographing lens assembly.

The detailed optical data of the 3rd embodiment are shown in Table 5 and the aspheric surface data are shown in Table 6 below.

TABLE 5

3rd Embodiment
f = 8.55 mm, Fno = 2.70, HFOV = 16.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.540 | | | | |
| 2 | Lens 1 | 2.430 (ASP) | 1.344 | Plastic | 1.545 | 56.0 | 3.48 |
| 3 | | −6.906 (ASP) | 0.162 | | | | |
| 4 | Lens 2 | −2.896 (ASP) | 0.351 | Plastic | 1.639 | 23.3 | −1.93 |
| 5 | | 2.239 (ASP) | 0.076 | | | | |
| 6 | Lens 3 | 1.669 (ASP) | 0.668 | Plastic | 1.660 | 20.4 | 3.46 |
| 7 | | 5.199 (ASP) | 0.172 | | | | |
| 8 | Lens 4 | −3.184 (ASP) | 0.438 | Plastic | 1.660 | 20.4 | 82.18 |
| 9 | | −3.172 (ASP) | 0.196 | | | | |
| 10 | Lens 5 | 2.641 (ASP) | 0.404 | Plastic | 1.544 | 56.0 | −51.42 |
| 11 | | 2.283 (ASP) | 0.700 | | | | |
| 12 | IR-cut filter | Plano | 0.300 | Glass | 1.517 | 64.2 | — |
| 13 | | Plano | 3.830 | — | | | |
| 14 | Image | Plano | | | | | |

Note:
Reference wavelength is 587.6 nm (d-line).

TABLE 6

| Aspheric Coefficients | | | | | |
|---|---|---|---|---|---|
| Surface # | 2 | 3 | 4 | 5 | 6 |
| k= | 1.4446E−01 | −2.5604E−01 | 9.2061E−01 | −8.8366E−01 | −3.8295E−01 |
| A4= | −7.9008E−03 | 3.0393E−02 | 2.0820E−01 | 7.9153E−02 | −1.2070E−01 |
| A6= | 5.6835E−03 | 5.4333E−02 | −1.5174E−01 | −9.3916E−02 | 4.7096E−02 |
| A8= | −5.0124E−03 | −1.0759E−01 | 3.6837E−02 | 2.1895E−02 | −4.1864E−03 |
| A10= | 1.8402E−03 | 7.5231E−02 | 1.9919E−02 | 9.0233E−03 | −3.4208E−02 |
| A12= | −2.9723E−04 | −2.4053E−02 | −1.3274E−02 | −3.7631E−03 | 2.6753E−02 |
| A14= | — | 2.8709E−03 | 2.0404E−03 | −8.3323E−05 | −5.6660E−03 |
| Surface # | 7 | 8 | 9 | 10 | 11 |
| k= | 1.1936E+01 | −7.2888E−02 | 1.4405E+00 | −1.7624E+01 | −1.9305E+01 |
| A4= | −4.7603E−02 | 1.6359E−01 | 1.1773E−01 | −8.5657E−02 | −1.8888E−02 |
| A6= | −2.9713E−02 | −5.8140E−02 | 5.2588E−02 | 3.9521E−02 | −8.5908E−02 |
| A8= | 1.2909E−01 | 7.2076E−02 | −1.3323E−01 | −1.2038E−01 | 8.7693E−02 |
| A10= | −1.5822E−01 | −1.0081E−01 | 1.1007E−01 | 1.3073E−01 | −4.8790E−02 |
| A12= | 8.4398E−02 | 6.4385E−02 | −4.2973E−02 | −6.7454E−02 | 1.4388E−02 |
| A14= | −1.5933E−02 | −1.4254E−02 | 7.2849E−03 | 1.3853E−02 | −1.7609E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 8.55 | f/f2 | −4.44 |
| Fno | 2.70 | f3/f1 | 1.00 |
| HFOV [deg.] | 16.0 | (f/f1) − (f/f2) + (f/f3) | 9.36 |
| (V2 + V3 + V4 + V5)/V1 | 2.14 | BL/ImgH | 1.92 |
| CT1/CT2 | 3.83 | BL/TD | 1.27 |
| T34/T45 | 0.88 | SD/TD | 0.86 |
| ΣAT/CT1 | 0.45 | ImgH/f | 0.29 |
| ΣAT/ΣCT | 0.19 | EPD/ImgH | 1.26 |
| R1/R5 | 1.46 | TL/f | 1.01 |
| R1/R7 | −0.76 | Y11/Y52 | 1.04 |
| R5/f | 0.20 | Yc42/CT4 | 2.09 |
| (R3 + R4)/(R3 − R4) | 0.13 | — | — |

4th Embodiment

Figure 7:
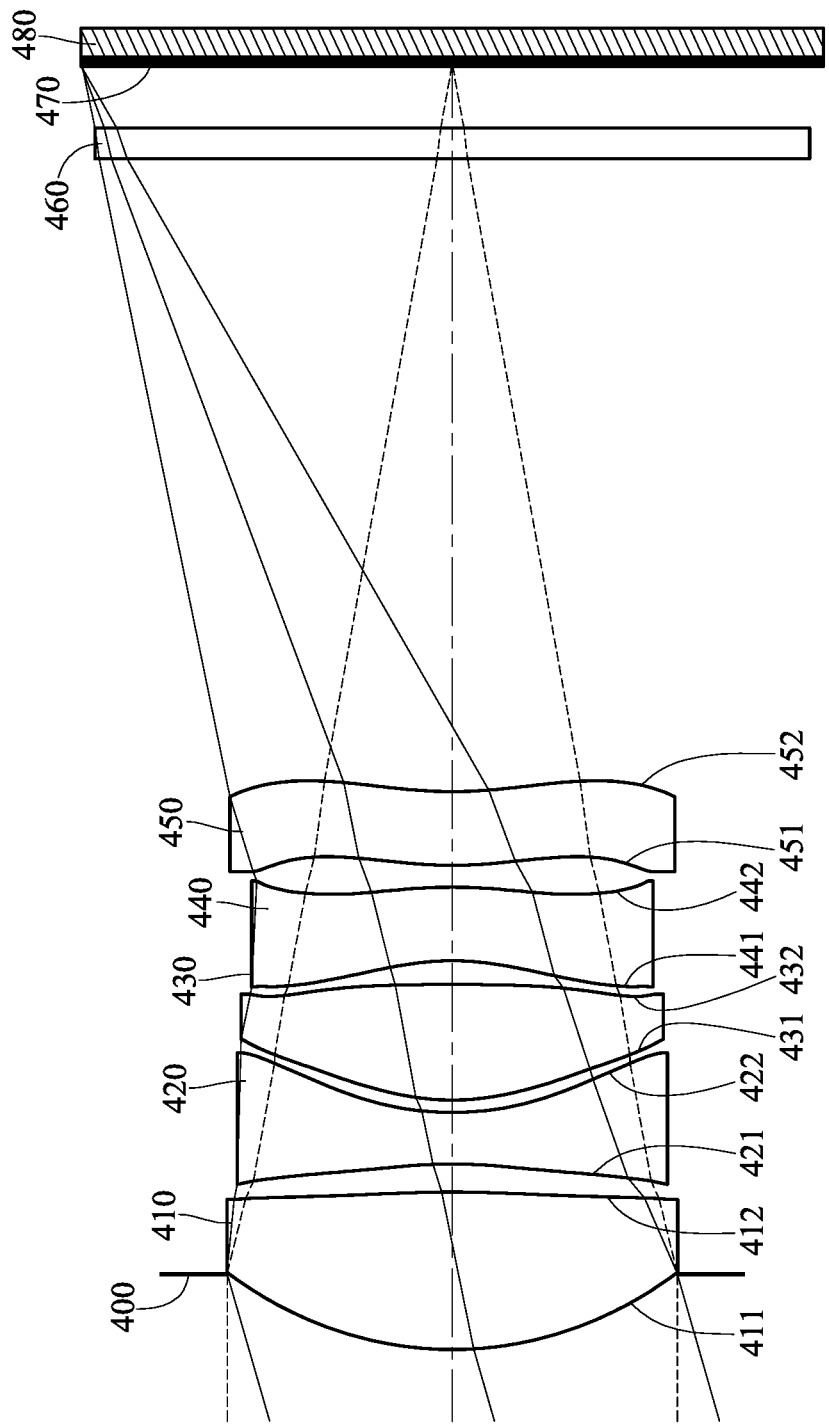
FIG. 7 is a schematic view of an image capturing unit according to the 4th embodiment of the present disclosure.
Figure 8:
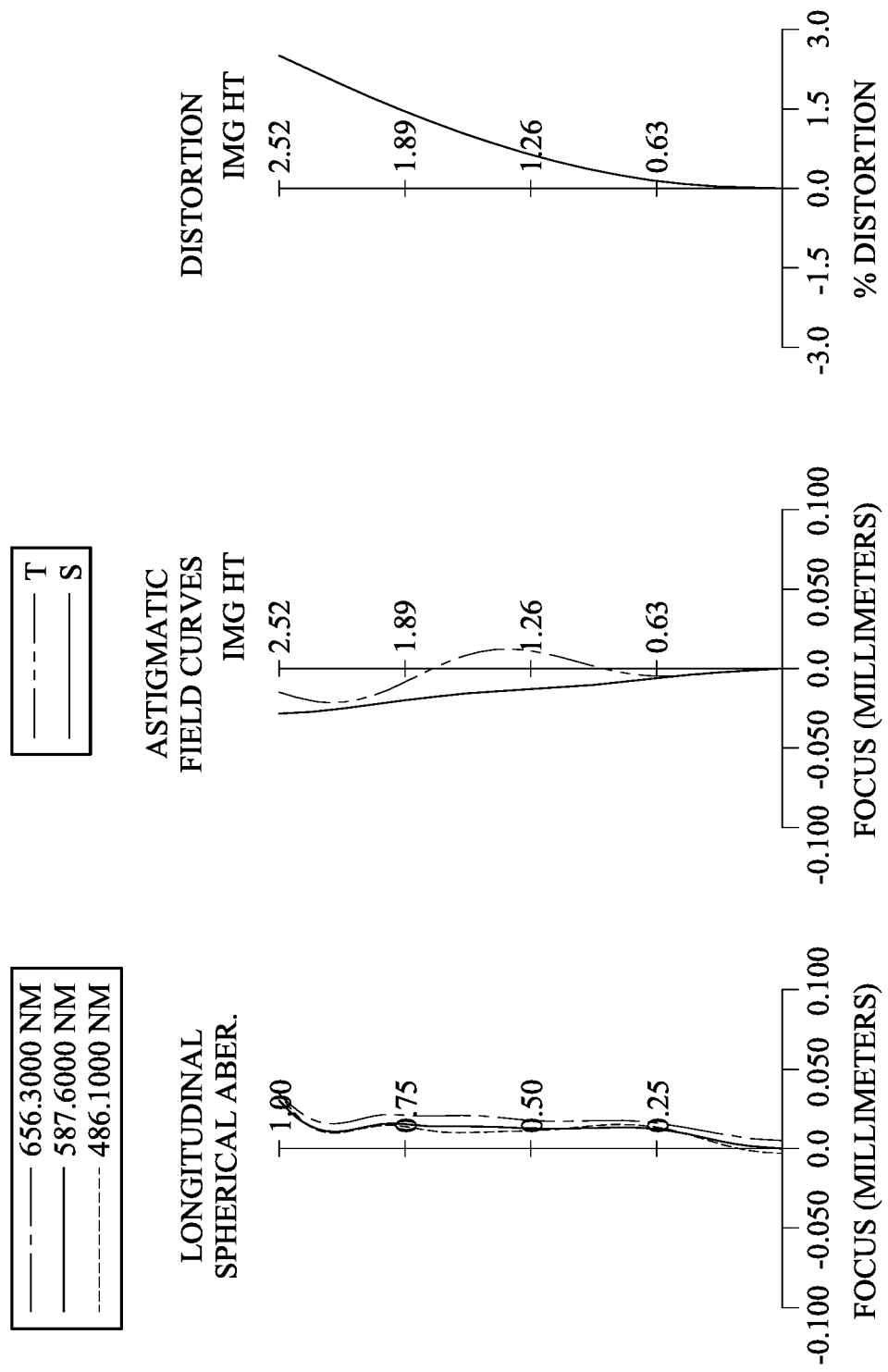
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 480. The photographing lens assembly includes, in order from an object side to an image side, an aperture stop 400, a first lens element 410, a second lens element 420, a third lens element 430, a fourth lens element 440, a fifth lens element 450, an IR-cut filter 460 and an image surface 470. The photographing lens assembly includes five lens elements (410-450) with no additional lens element disposed between the first lens element 410 and the fifth lens element 450.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. The image-side surface 412 of the first lens element 410 has at least one inflection point.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. Both the object-side surface 421 and the image-side surface 422 of the second lens element 420 have at least one inflection point.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. Both the object-side surface 431 and the image-side surface 432 of the third lens element 430 have at least one inflection point.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has at least one inflection point. The image-side surface 442 of the fourth lens element 440 has at least one concave shape in an off-axial region thereof. The image-side surface 442 of the fourth lens element 440 has at least one concave critical point in an off-axial region thereof.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one concave shape in an off-axial region thereof. The image-side surface 452 of the fifth lens element 450 has at least one convex shape in an off-axial region thereof.

The IR-cut filter 460 is made of glass material and located between the fifth lens element 450 and the image surface 470, and will not affect the focal length of the photographing lens assembly. The image sensor 480 is disposed on or near the image surface 470 of the photographing lens assembly.

The detailed optical data of the 4th embodiment are shown in Table 7 and the aspheric surface data are shown in Table 8 below.

TABLE 7

4th Embodiment
f = 8.55 mm, Fno = 2.80, HFOV = 16.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.513 | | | | |
| 2 | Lens 1 | 2.409 (ASP) | 1.070 | Plastic | 1.545 | 56.1 | 3.50 |
| 3 | | −7.756 (ASP) | 0.191 | | | | |
| 4 | Lens 2 | −2.995 (ASP) | 0.350 | Plastic | 1.639 | 23.3 | −1.88 |
| 5 | | 2.104 (ASP) | 0.084 | | | | |
| 6 | Lens 3 | 1.644 (ASP) | 0.785 | Plastic | 1.660 | 20.4 | 2.39 |
| 7 | | −31.112 (ASP) | 0.162 | | | | |
| 8 | Lens 4 | −1.779 (ASP) | 0.500 | Plastic | 1.660 | 20.4 | −6.86 |
| 9 | | −3.256 (ASP) | 0.149 | | | | |
| 10 | Lens 5 | 2.800 (ASP) | 0.500 | Plastic | 1.544 | 56.0 | 89.56 |
| 11 | | 2.784 (ASP) | 4.300 | | | | |
| 12 | IR-cut filter | Plano | 0.210 | Glass | 1.517 | 64.2 | — |
| 13 | | Plano | 0.418 | | | | |
| 14 | Image | Plano | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k= | 1.2591E−01 | −2.8080E+00 | 9.6910E−01 | −1.3401E+00 | −3.3811E−01 |
| A4= | −8.2423E−03 | 3.1695E−02 | 2.0831E−01 | 7.3958E−02 | −1.1491E−01 |
| A6= | 6.7924E−03 | 5.5186E−02 | −1.5136E−01 | −9.0460E−02 | 4.1347E−02 |
| A8= | −5.8777E−03 | −1.0820E−01 | 3.7095E−02 | 2.2936E−02 | −3.9655E−03 |
| A10= | 2.1902E−03 | 7.5407E−02 | 1.9042E−02 | 1.0376E−02 | −3.4758E−02 |
| A12= | −3.2943E−04 | −2.4094E−02 | −1.3248E−02 | −6.0129E−03 | 2.7014E−02 |
| A14= | — | 2.9176E−03 | 2.1559E−03 | 4.5728E−04 | −5.7006E−03 |

| Surface # | 7 | 8 | 9 | 10 | 11 |
|---|---|---|---|---|---|
| k= | −9.0000E+01 | −7.7648E−01 | 4.7175E−01 | −1.9896E+01 | −2.2382E+01 |
| A4= | −5.6589E−02 | 1.7107E−01 | 1.1975E−01 | −7.3974E−02 | −3.0675E−02 |
| A6= | −2.1011E−02 | −6.5390E−02 | 6.4772E−02 | 1.3379E−02 | −5.2949E−02 |
| A8= | 1.2841E−01 | 7.3109E−02 | −1.3807E−01 | −4.4419E−02 | 6.6580E−02 |
| A10= | −1.5851E−01 | −1.0005E−01 | 1.0666E−01 | 5.5908E−02 | −4.3533E−02 |
| A12= | 8.4918E−02 | 6.4030E−02 | −4.3274E−02 | −3.4803E−02 | 1.4433E−02 |
| A14= | −1.5999E−02 | −1.4388E−02 | 7.9497E−03 | 8.4764E−03 | −1.9149E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.55 | f/f2 | −4.54 |
| Fno | 2.80 | f3/f1 | 0.68 |
| HFOV [deg.] | 16.0 | (f/f1) − (f/f2) + (f/f3) | 10.56 |
| (V2 + V3 + V4 + V5)/V1 | 2.14 | BL/ImgH | 1.96 |
| CT1/CT2 | 3.06 | BL/TD | 1.30 |
| T34/T45 | 1.09 | SD/TD | 0.86 |
| ΣAT/CT1 | 0.55 | ImgH/f | 0.29 |
| ΣAT/ΣCT | 0.18 | EPD/ImgH | 1.21 |
| R1/R5 | 1.47 | TL/f | 1.02 |
| R1/R7 | −1.35 | Y11/Y52 | 1.01 |
| R5/f | 0.19 | Yc42/CT4 | 1.65 |
| (R3 + R4)/(R3 − R4) | 0.17 | — | — |

5th Embodiment

Figure 9:
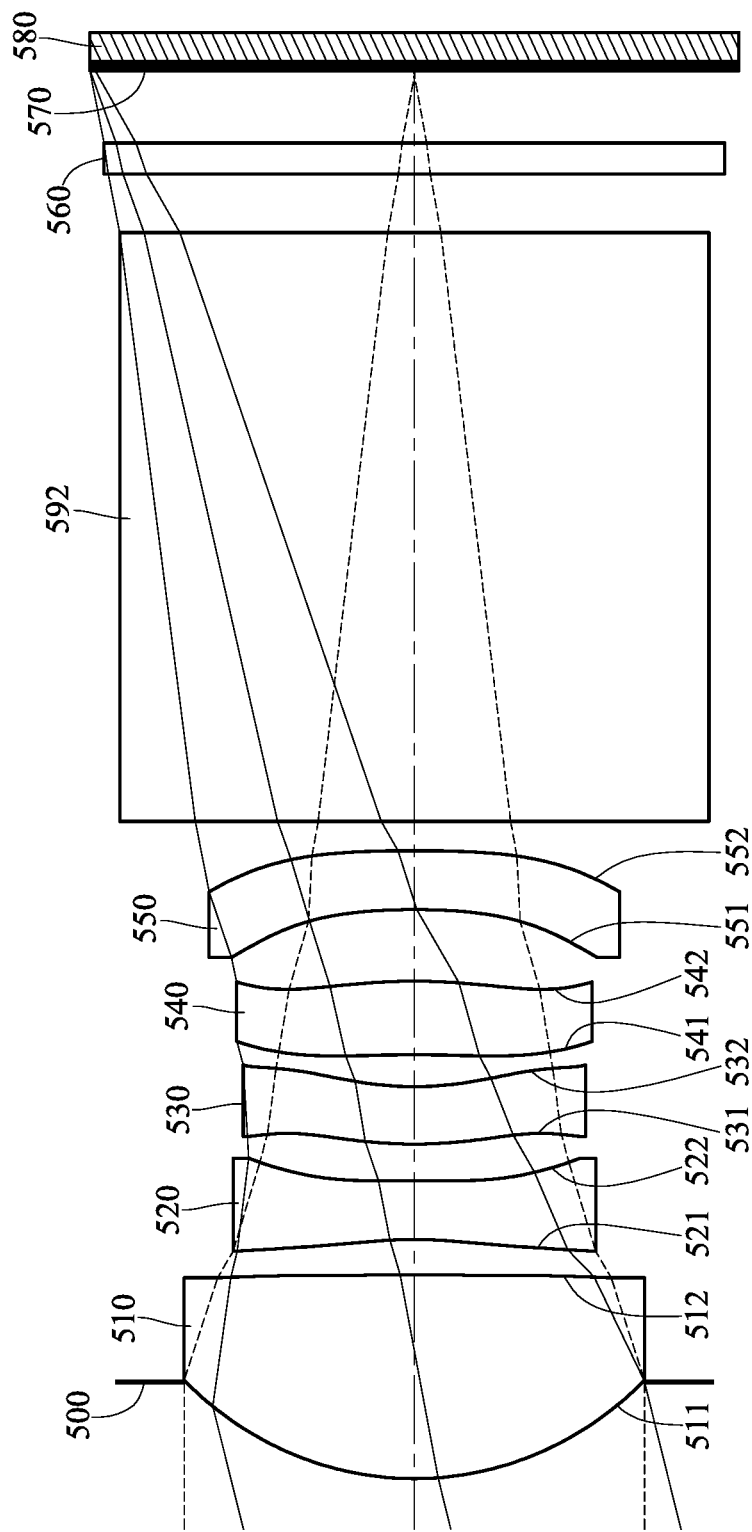
FIG. 9 is a schematic view of an image capturing unit according to the 5th embodiment of the present disclosure.
Figure 9A:
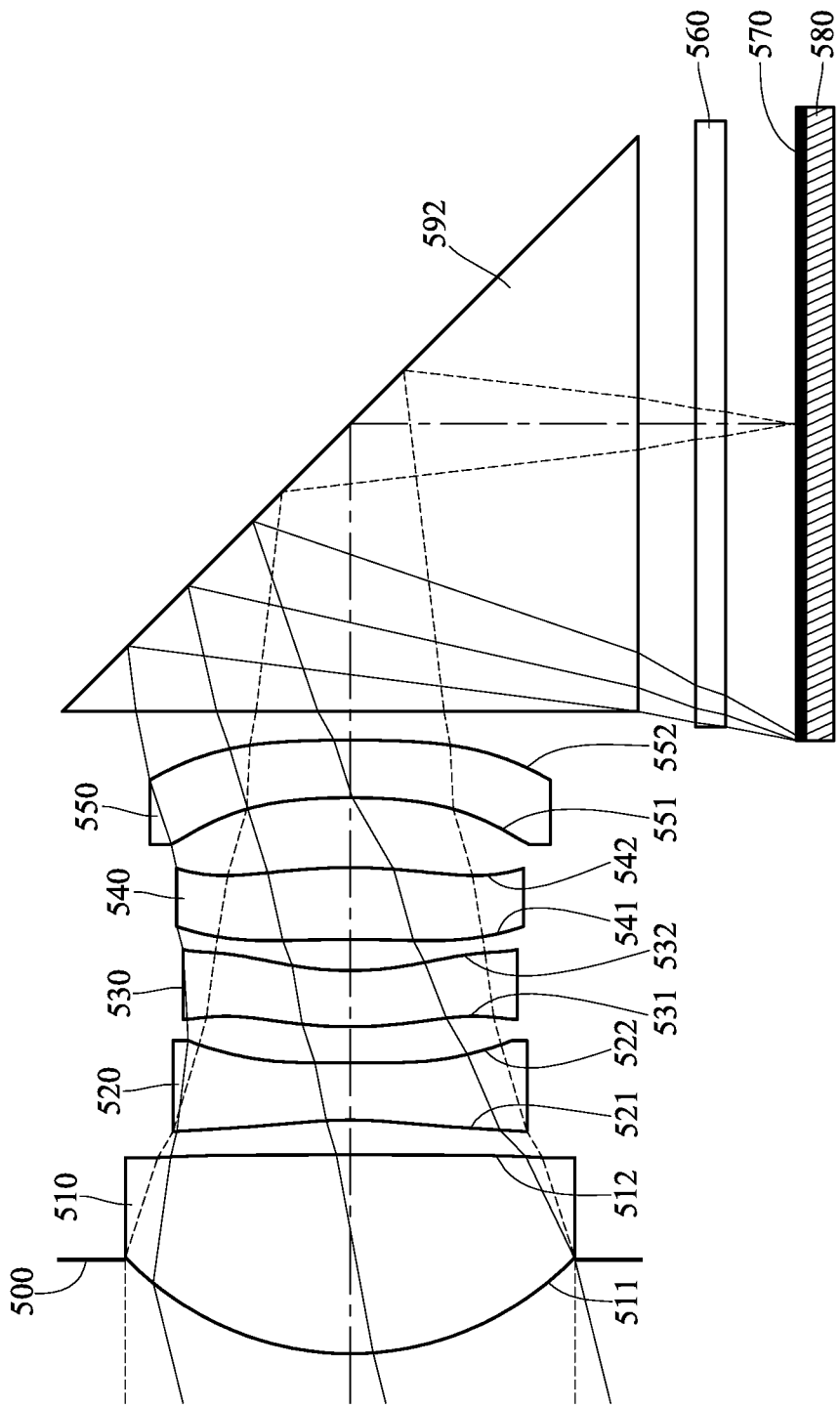
FIG. 9A is a schematic view of the image capturing unit with another configuration of prism according to the 5th embodiment of the present disclosure.
Figure 10:
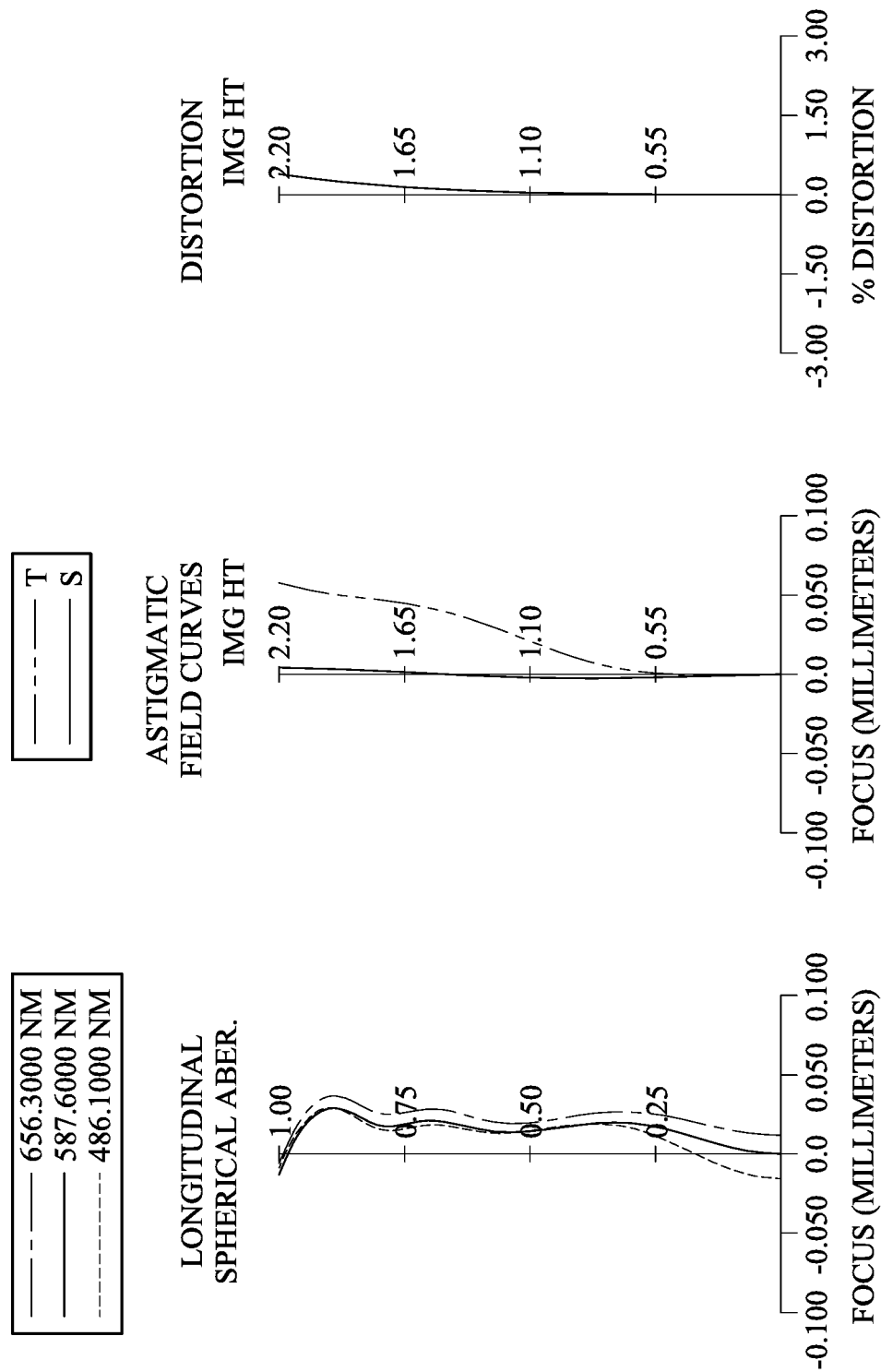
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 9A is a schematic view of the image capturing unit with another configuration of prism according to the 5th embodiment of the present disclosure. FIG. 10 shows, in order from left to right, spherical aberration curves, astigmatic field curves and a distortion curve of the image capturing unit according to the 5th embodiment. In FIG. 9 and FIG. 9A, the image capturing unit includes the photographing lens assembly (its reference numeral is omitted) of the present disclosure and an image sensor 580. The photographing lens assembly includes, in order from an object side to an image side, an aperture stop 500, a first lens element 510, a second lens element 520, a third lens element 530, a fourth lens element 540, a fifth lens element 550, an image-side prism 592, an IR-cut filter 560 and an image surface 570. The photographing lens assembly includes five lens elements (510-550) with no additional lens element disposed between the first lens element 510 and the fifth lens element 550.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The image-side surface 512 of the first lens element 510 has at least one inflection point.

The second lens element 520 with negative refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric. Both the object-side surface 521 and the image-side surface 522 of the second lens element 520 have at least one inflection point.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. Both the object-side surface 531 and the image-side surface 532 of the third lens element 530 have at least one inflection point.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point. The image-side surface 542 of the fourth lens element 540 has at least one concave shape in an off-axial region thereof. The image-side surface 542 of the fourth lens element 540 has at least one concave critical point in an off-axial region thereof.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has at least one inflection point.

The IR-cut filter 560 is made of glass material and located between the fifth lens element 550 and the image surface 570, and will not affect the focal length of the photographing lens assembly. The image sensor 580 is disposed on or near the image surface 570 of the photographing lens assembly.

The image-side prism 592 is made of glass material. In FIG. 9, a configuration of the image-side prism 592 in the image capturing unit is for extending the optical axis. In FIG. 9A, a configuration of the image-side prism 592 in the image capturing unit is for changing the direction of the optical axis.

The detailed optical data of the 5th embodiment are shown in Table 9 and the aspheric surface data are shown in Table 10 below.

TABLE 9

5th Embodiment
f = 8.81 mm, Fno = 2.82, HFOV = 13.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.655 | | | | |
| 2 | Lens 1 | 2.114 (ASP) | 1.384 | Plastic | 1.545 | 56.1 | 3.76 |
| 3 | | −49.725 (ASP) | 0.241 | | | | |
| 4 | Lens 2 | −2.899 (ASP) | 0.400 | Plastic | 1.639 | 23.3 | −5.97 |
| 5 | | −12.733 (ASP) | 0.249 | | | | |
| 6 | Lens 3 | 3.247 (ASP) | 0.390 | Plastic | 1.544 | 56.0 | −13.73 |
| 7 | | 2.167 (ASP) | 0.217 | | | | |
| 8 | Lens 4 | −8.258 (ASP) | 0.500 | Plastic | 1.660 | 20.4 | 10.11 |
| 9 | | −3.780 (ASP) | 0.486 | | | | |
| 10 | Lens 5 | −4.626 (ASP) | 0.400 | Plastic | 1.639 | 23.3 | −11.13 |
| 11 | | −13.690 (ASP) | 0.200 | | | | |
| 12 | Prism | Plano | 4.000 | Glass | 1.517 | 64.2 | — |
| 13 | | Plano | 0.400 | | | | |
| 14 | IR-cut filter | Plano | 0.210 | Glass | 1.517 | 64.2 | — |
| 15 | | Plano | 0.491 | | | | |
| 16 | Image | Plano | — | | | | |

Note:
Reference wavelength is 587.6 nm (d-line).

The image-side prism 592 has a reflective surface.

An effective radius of an image-side surface of the image-side prism 592 (Surface 13) is 2.000 mm.

TABLE 10

Aspheric Coefficients

| Surface # | 2 | 3 | 4 | 5 | 6 |
|---|---|---|---|---|---|
| k= | 0.0000E+00 | 0.0000E+00 | 0.0000E+00 | 0.0000E+00 | 0.0000E+00 |
| A4= | −2.8238E−03 | 7.5348E−03 | 2.4225E−01 | 3.3905E−01 | 4.4463E−02 |
| A6= | 6.9578E−04 | 1.1869E−02 | −2.0420E−01 | −3.1857E−01 | −2.8814E−01 |
| A8= | −4.5453E−04 | −3.2647E−02 | 8.3610E−02 | 1.5638E−01 | 2.3687E−01 |
| A10= | 2.0618E−05 | 2.0423E−02 | −8.2469E−03 | −2.9640E−02 | −1.4546E−01 |
| A12= | −2.0054E−06 | −4.0623E−03 | −2.1723E−03 | 5.2027E−05 | 7.7320E−02 |
| A14= | — | — | — | — | −1.7154E−02 |

| Surface # | 7 | 8 | 9 | 10 | 11 |
|---|---|---|---|---|---|
| k= | 0.0000E+00 | 0.0000E+00 | 0.0000E+00 | 0.0000E+00 | 0.0000E+00 |
| A4= | −5.3510E−02 | 1.1535E−01 | 6.2763E−02 | −1.0020E−01 | −8.6628E−02 |
| A6= | −1.0991E−01 | −1.8694E−02 | 1.6831E−02 | 1.6433E−02 | 3.0927E−02 |
| A8= | 2.2055E−03 | −6.3320E−03 | −2.0014E−03 | 1.0384E−02 | −1.6455E−02 |

TABLE 10-continued

| Aspheric Coefficients | | | | |
| --- | --- | --- | --- | --- |
| A10= 9.6551E−02 | 9.1838E−03 | 3.4418E−02 | −2.0554E−02 | 7.6343E−03 |
| A12= −7.3826E−02 | −7.7795E−03 | −3.4516E−02 | 1.5956E−02 | −2.1476E−03 |
| A14= 2.2575E−02 | 2.5949E−03 | 8.6862E−03 | −3.4514E−03 | 2.8927E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
| --- | --- | --- | --- |
| f [mm] | 8.81 | f/f2 | −1.48 |
| Fno | 2.82 | f3/f1 | −3.66 |
| HFOV [deg.] | 13.9 | (f/f1) − (f/f2) + (f/f3) | 3.18 |
| (V2 + V3 + V4 + V5)/V1 | 2.19 | BL/ImgH | 2.41 |
| CT1/CT2 | 3.46 | BL/TD | 1.24 |
| T34/T45 | 0.45 | SD/TD | 0.85 |
| ΣAT/CT1 | 0.86 | ImgH/f | 0.25 |
| ΣAT/ΣCT | 0.39 | EPD/ImgH | 1.42 |
| R1/R5 | 0.65 | TL/f | 1.09 |
| R1/R7 | −0.26 | Y11/Y52 | 1.12 |
| R5/f | 0.37 | Yc42/CT4 | 3.65 |
| (R3 + R4)/(R3 − R4) | −1.59 | — | — |

6th Embodiment

Figure 11:
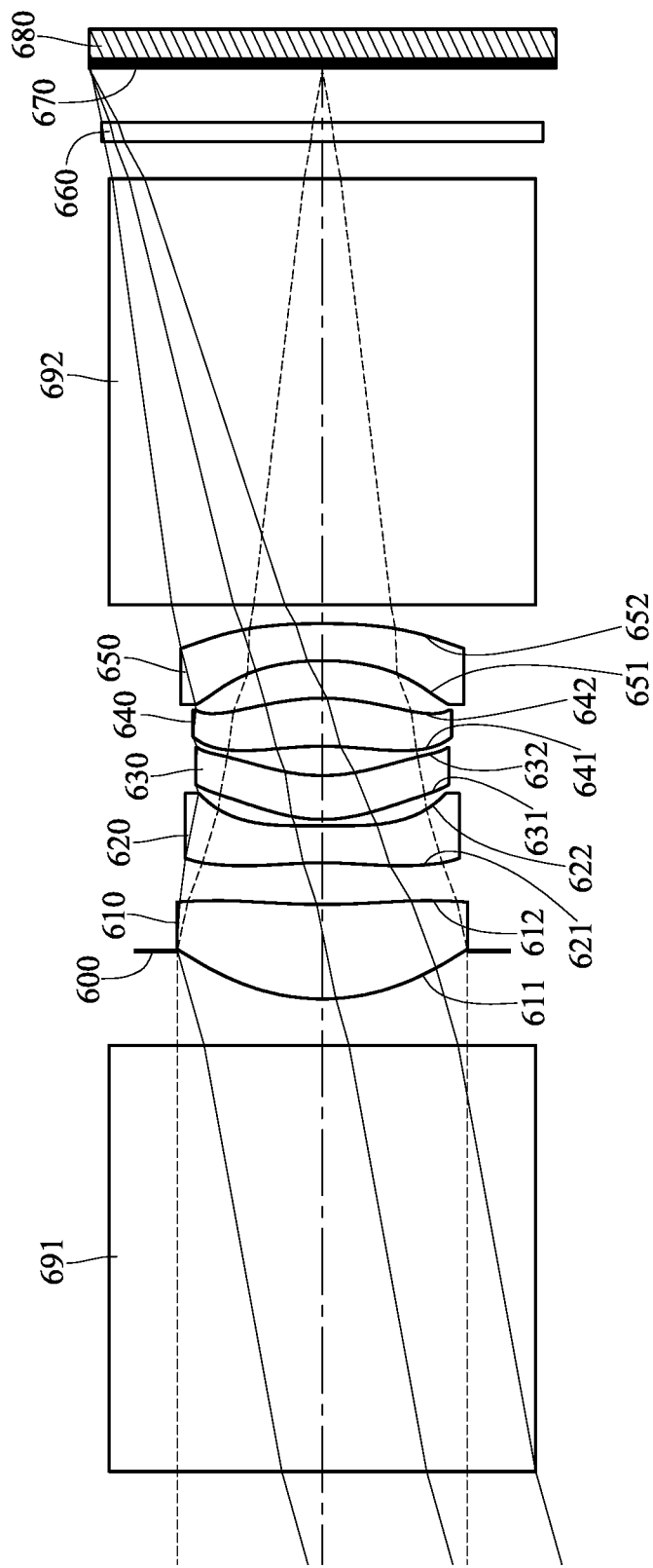
FIG. 11 is a schematic view of an image capturing unit according to the 6th embodiment of the present disclosure.
Figure 11A:
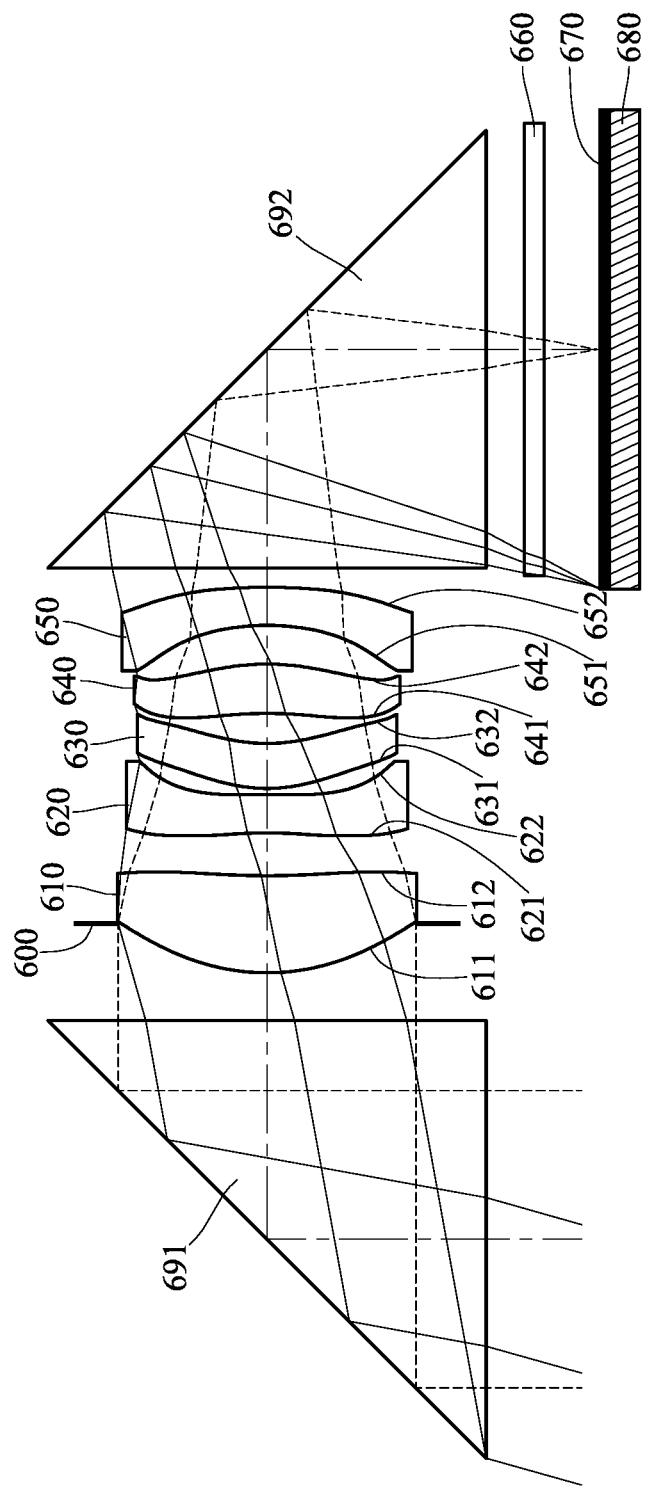
FIG. 11A is a schematic view of the image capturing unit with another configuration of prism according to the 6th embodiment of the present disclosure.
Figure 11B:
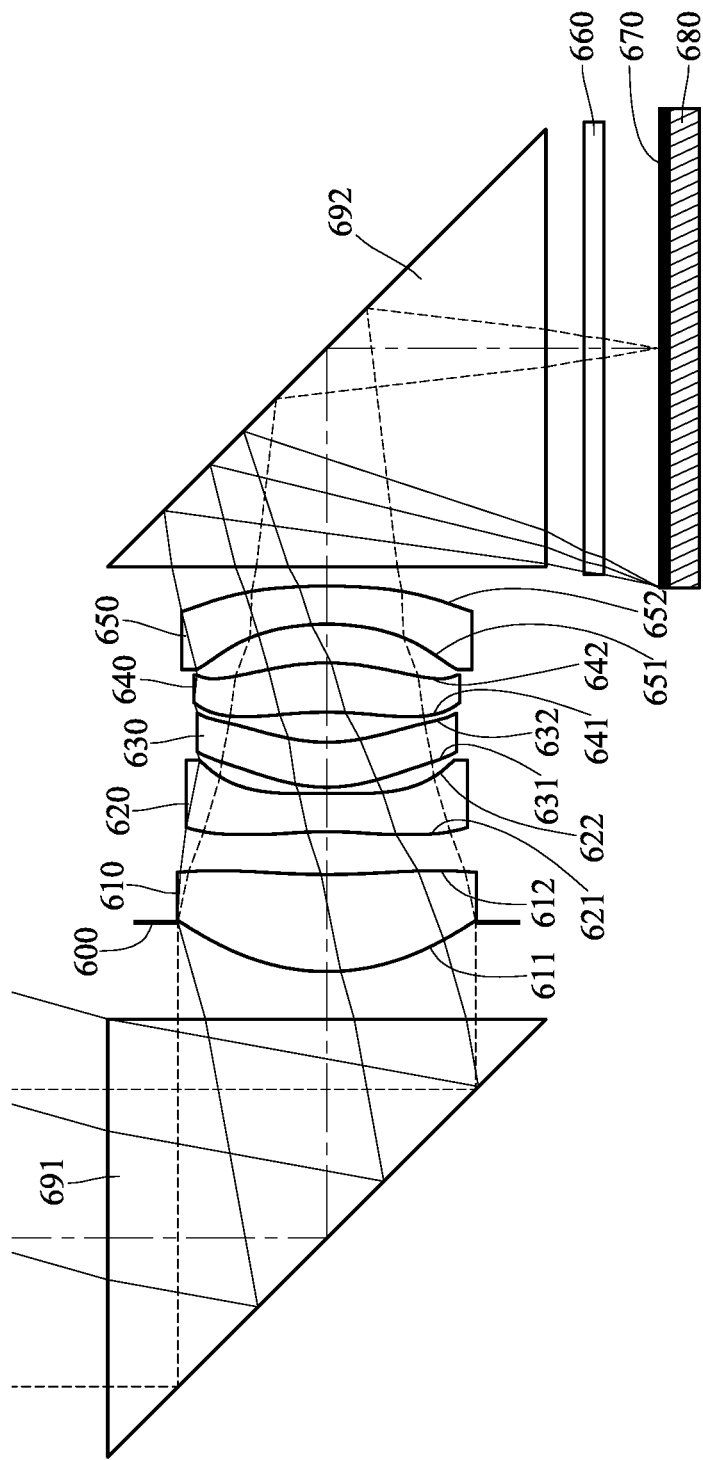
FIG. 11B is a schematic view of the image capturing unit with still another configuration of prism according to the 6th embodiment of the present disclosure.
Figure 12:
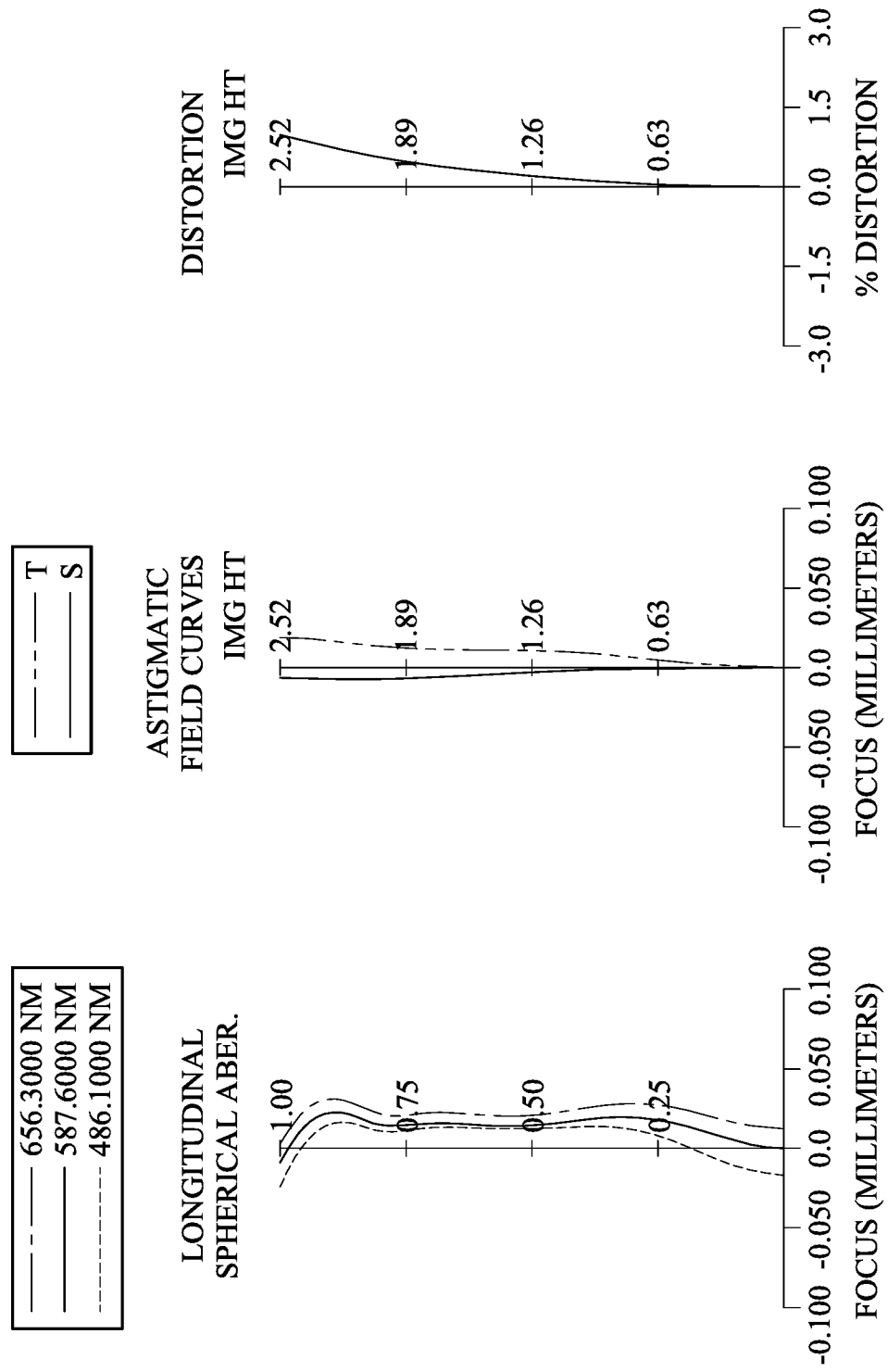
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 11A is a schematic view of the image capturing unit with another configuration of prism according to the 6th embodiment of the present disclosure. FIG. 11B is a schematic view of the image capturing unit with still another configuration of prism according to the 6th embodiment of the present disclosure. FIG. 12 shows, in order from left to right, spherical aberration curves, astigmatic field curves and a distortion curve of the image capturing unit according to the 6th embodiment. In FIG. 11 to FIG. 11B, the image capturing unit includes the photographing lens assembly (its reference numeral is omitted) of the present disclosure and an image sensor 680. The photographing lens assembly includes, in order from an object side to an image side, an object-side prism 691, an aperture stop 600, a first lens element 610, a second lens element 620, a third lens element 630, a fourth lens element 640, a fifth lens element 650, an image-side prism 692, an IR-cut filter 660 and an image surface 670. The photographing lens assembly includes five lens elements (610-650) with no additional lens element disposed between the first lens element 610 and the fifth lens element 650.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The image-side surface 612 of the first lens element 610 has at least one inflection point.

The second lens element 620 with negative refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric. Both the object-side surface 621 and the image-side surface 622 of the second lens element 620 have at least one inflection point.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. Both the object-side surface 631 and the image-side surface 632 of the third lens element 630 have at least one inflection point.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one inflection point. The image-side surface 642 of the fourth lens element 640 has at least one concave shape in an off-axial region thereof. The image-side surface 642 of the fourth lens element 640 has at least one concave critical point in an off-axial region thereof.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The IR-cut filter 660 is made of glass material and located between the fifth lens element 650 and the image surface 670, and will not affect the focal length of the photographing lens assembly. The image sensor 680 is disposed on or near the image surface 670 of the photographing lens assembly.

Both the object-side prism 691 and the image-side prism 692 are made of glass material. In FIG. 11, a configuration of the object-side prism 691 and the image-side prism 692 in the image capturing unit is for extending the optical axis. In FIG. 11A and FIG. 11B, a configuration of the object-side prism 691 and the image-side prism 692 in the image capturing unit is for changing the direction of the optical axis.

The detailed optical data of the 6th embodiment are shown in Table 11 and the aspheric surface data are shown in Table 12 below.

TABLE 11

6th Embodiment
f = 8.81 mm, Fno = 2.82, HFOV = 15.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | Plano | | 4.600 | Glass | 1.517 | 64.2 | — |
| 2 | | Plano | | 1.017 | | | | |
| 3 | Ape. Stop | Plano | | −0.517 | | | | |
| 4 | Lens 1 | 2.298 | (ASP) | 1.020 | Plastic | 1.545 | 56.1 | 5.55 |
| 5 | | 8.055 | (ASP) | 0.450 | | | | |
| 6 | Lens 2 | −4.096 | (ASP) | 0.400 | Plastic | 1.639 | 23.3 | −7.93 |
| 7 | | −22.191 | (ASP) | 0.067 | | | | |
| 8 | Lens 3 | 1.646 | (ASP) | 0.473 | Plastic | 1.544 | 56.0 | 16.11 |
| 9 | | 1.822 | (ASP) | 0.316 | | | | |
| 10 | Lens 4 | −3.742 | (ASP) | 0.518 | Plastic | 1.660 | 20.4 | 8.42 |
| 11 | | −2.360 | (ASP) | 0.406 | | | | |
| 12 | Lens 5 | −2.603 | (ASP) | 0.400 | Plastic | 1.639 | 23.3 | −6.55 |
| 13 | | −7.300 | (ASP) | 0.200 | | | | |
| 14 | Prism | Plano | | 4.600 | Glass | 1.517 | 64.2 | — |
| 15 | | Plano | | 0.400 | | | | |
| 16 | IR-cut filter | Plano | | 0.210 | Glass | 1.517 | 64.2 | — |
| 17 | | Plano | | 0.581 | | | | |
| 18 | Image | Plano | | — | | | | |

Note:
Reference wavelength is 587.6 nm (d-line).
At least one of the object-side prism 691 and the image-side prism 692 has a reflective surface.
An effective radius of an object-side surface of the object-side prism 691 (Surface 1) is 2.300 mm.

TABLE 12

Aspheric Coefficients

| Surface # | 4 | 5 | 6 | 7 | 8 |
|---|---|---|---|---|---|
| k= | 0.0000E+00 | 0.0000E+00 | 0.0000E+00 | 0.0000E+00 | 0.0000E+00 |
| A4= | −5.2966E−03 | −2.1319E−02 | 1.7553E−02 | 1.9749E−01 | −1.1079E−01 |
| A6= | −1.5905E−03 | 2.1096E−03 | −1.2360E−01 | −7.7241E−02 | 3.3660E−02 |
| A8= | 2.1775E−04 | −7.9169E−03 | 5.0154E−02 | −1.3346E−02 | −6.7299E−02 |
| A10= | −6.6689E−04 | 4.7100E−03 | −7.3018E−03 | 4.0681E−02 | 4.6094E−02 |
| A12= | 1.2767E−04 | −7.4930E−04 | −5.1729E−05 | −1.2358E−02 | −1.0239E−02 |
| A14= | — | — | — | — | 2.7123E−04 |

| Surface # | 9 | 10 | 11 | 12 | 13 |
|---|---|---|---|---|---|
| k= | 0.0000E+00 | 0.0000E+00 | 0.0000E+00 | 0.0000E+00 | 0.0000E+00 |
| A4= | −1.3521E−01 | 1.0374E−01 | 9.0939E−02 | −1.5524E−02 | −3.2493E−02 |
| A6= | 8.3895E−02 | −2.3483E−02 | −3.6896E−02 | −4.6331E−02 | −4.6276E−03 |
| A8= | −9.0967E−02 | 3.6751E−02 | 3.6651E−02 | 3.5008E−02 | 8.2684E−03 |
| A10= | 4.7582E−02 | −4.3945E−02 | −3.1727E−02 | −2.0768E−02 | −3.0145E−03 |
| A12= | −1.2512E−02 | 2.5348E−02 | 1.9533E−02 | 1.0514E−02 | 8.0577E−04 |
| A14= | 2.2406E−03 | −4.9892E−03 | −4.0623E−03 | −1.6624E−03 | −1.0171E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 8.81 | f/f2 | −1.11 |
| Fno | 2.82 | f3/f1 | 2.90 |
| HFOV [deg.] | 15.8 | (f/f1) − (f/f2) + (f/f3) | 3.24 |
| (V2 + V3 + V4 + V5)/V1 | 2.19 | BL/ImgH | 2.38 |
| CT1/CT2 | 2.55 | BL/TD | 1.48 |
| T34/T45 | 0.78 | SD/TD | 0.87 |
| ΣAT/CT1 | 1.21 | ImgH/f | 0.29 |
| ΣAT/ΣCT | 0.44 | EPD/ImgH | 1.24 |
| R1/R5 | 1.40 | TL/f | 1.14 |
| R1/R7 | −0.61 | Y11/Y52 | 1.03 |
| R5/f | 0.19 | Yc42/CT4 | 2.28 |
| (R3 + R4)/(R3 − R4) | −1.45 | — | — |

7th Embodiment

Figure 13:
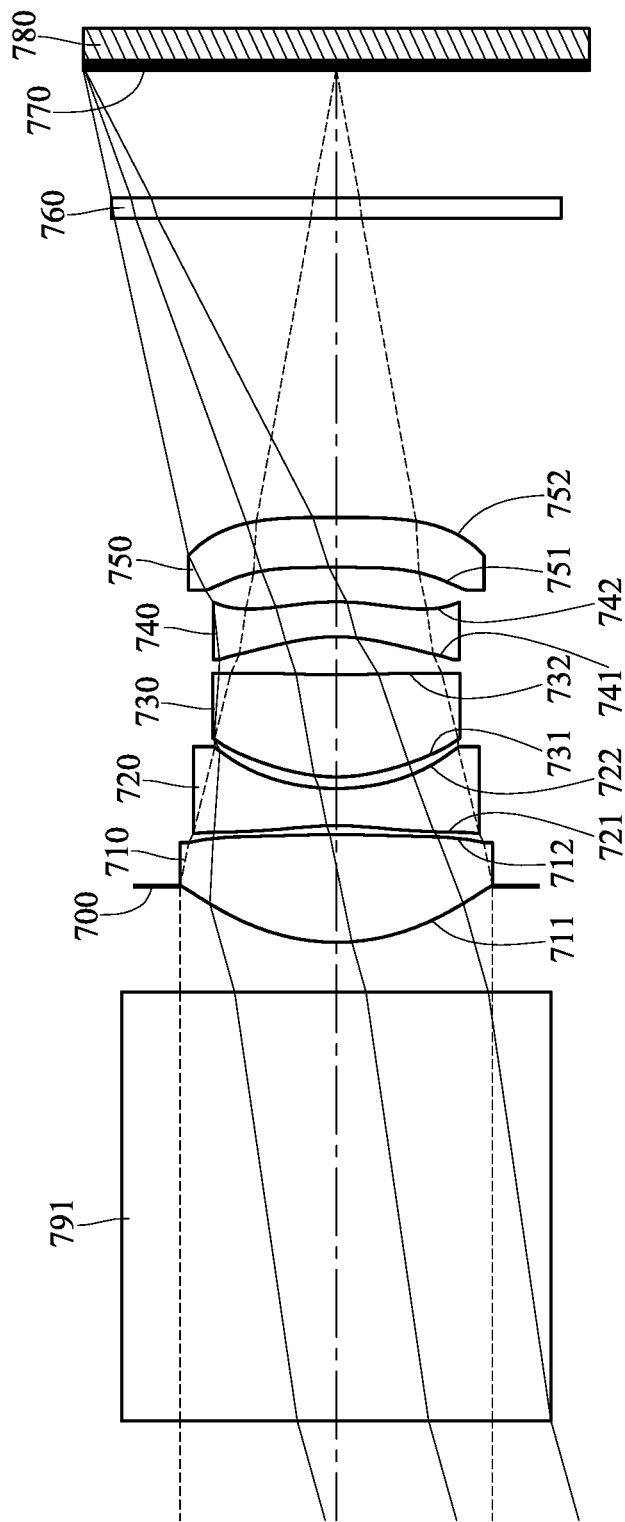
FIG. 13 a schematic view of an image capturing unit according to the 7th embodiment of the present disclosure.
Figure 13A:
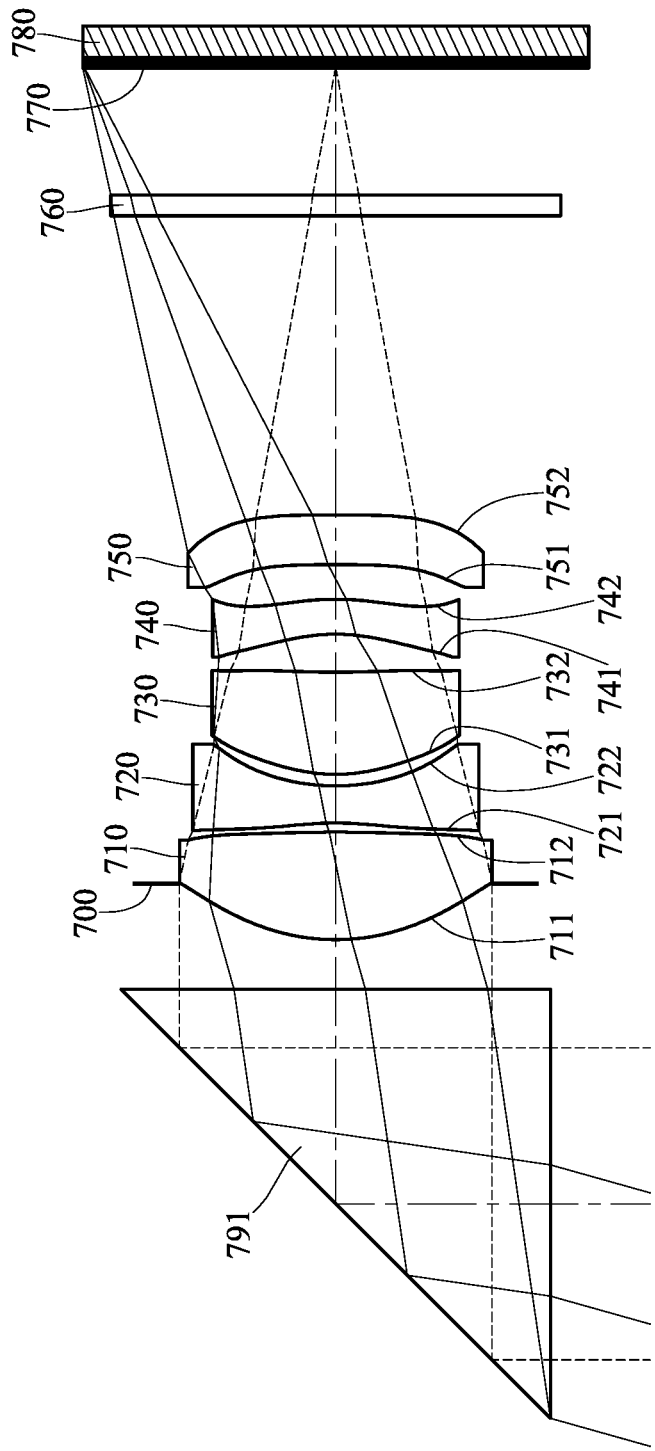
FIG. 13A is a schematic view of the image capturing unit with another configuration of prism according to the 7th embodiment of the present disclosure.
Figure 14:
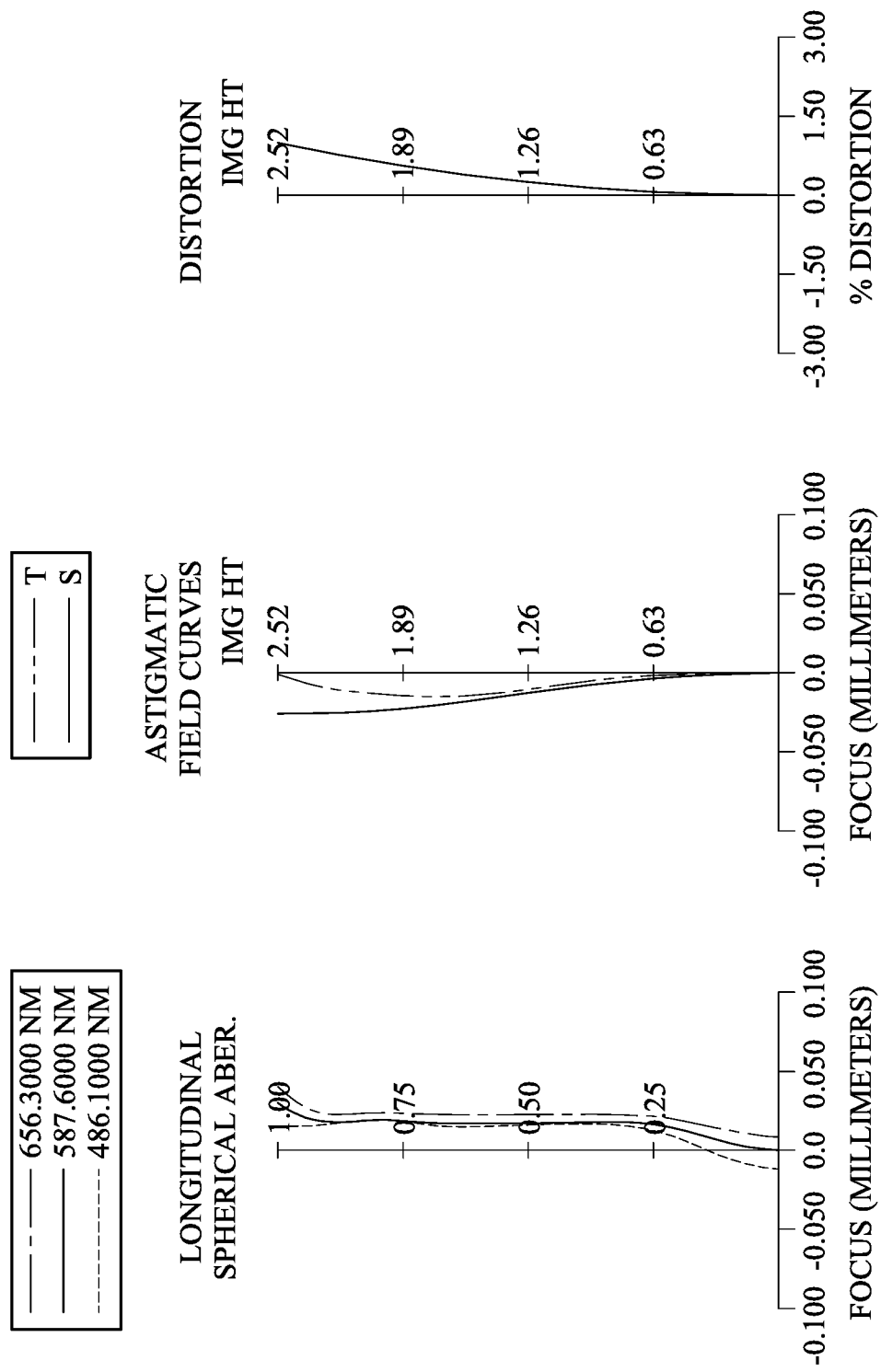
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 13A is a schematic view of the image capturing unit with another configuration of prism according to the 7th embodiment of the present disclosure. FIG. 14 shows, in order from left to right, spherical aberration curves, astigmatic field curves and a distortion curve of the image capturing unit according to the 7th embodiment. In FIG. 13 and FIG. 13A, the image capturing unit includes the photographing lens assembly (its reference numeral is omitted) of the present disclosure and an image sensor 780. The photographing lens assembly includes, in order from an object side to an image side, an object-side prism 791, an aperture stop 700, a first lens element 710, a second lens element 720, a third lens element 730, a fourth lens element 740, a fifth lens element 750, an IR-cut filter 760 and an image surface 770. The photographing lens assembly includes five lens elements (710-750) with no additional lens element disposed between the first lens element 710 and the fifth lens element 750.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric. Both object-side surface 711 and the image-side surface 712 of the first lens element 710 have at least one inflection point.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric. Both the object-side surface 721 and the image-side surface 722 of the second lens element 720 have at least one inflection point.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has at least one inflection point.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. The image-side surface 742 of the fourth lens element 740 has at least one concave shape in an off-axial region thereof. The image-side surface 742 of the fourth lens element 740 has at least one concave critical point in an off-axial region thereof.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The IR-cut filter 760 is made of glass material and located between the fifth lens element 750 and the image surface 770, and will not affect the focal length of the photographing lens assembly. The image sensor 780 is disposed on or near the image surface 770 of the photographing lens assembly.

The object-side prism 791 is made of glass material. In FIG. 13, a configuration of the object-side prism 791 in the image capturing unit is for extending the optical axis. In FIG. 13A, a configuration of the object-side prism 791 in the image capturing unit is for changing the direction of the optical axis.

The detailed optical data of the 7th embodiment are shown in Table 13 and the aspheric surface data are shown in Table 14 below.

TABLE 13

7th Embodiment
f = 8.82 mm, Fno = 2.82, HFOV = 15.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | Plano | | 4.300 | Glass | 1.883 | 40.8 | — |
| 2 | | Plano | | 1.060 | | | | |
| 3 | Ape. Stop | Plano | | −0.560 | | | | |
| 4 | Lens 1 | 2.134 | (ASP) | 1.079 | Plastic | 1.545 | 56.1 | 3.35 |
| 5 | | −10.364 | (ASP) | 0.091 | | | | |
| 6 | Lens 2 | −3.040 | (ASP) | 0.372 | Plastic | 1.639 | 23.3 | −1.94 |
| 7 | | 2.186 | (ASP) | 0.116 | | | | |
| 8 | Lens 3 | 1.637 | (ASP) | 1.025 | Plastic | 1.660 | 20.4 | 2.81 |
| 9 | | 10.359 | (ASP) | 0.381 | | | | |
| 10 | Lens 4 | −1.796 | (ASP) | 0.350 | Plastic | 1.639 | 23.3 | −10.86 |
| 11 | | −2.607 | (ASP) | 0.346 | | | | |
| 12 | Lens 5 | −46.680 | (ASP) | 0.499 | Plastic | 1.544 | 56.0 | −112.05 |
| 13 | | −200.000 | (ASP) | 3.000 | | | | |
| 14 | IR-cut filter | Plano | | 0.210 | Glass | 1.517 | 64.2 | — |
| 15 | | Plano | | 1.273 | | | | |
| 16 | Image | Plano | | — | | | | |

Note:
Reference wavelength is 587.6 nm (d-line).
The object-side prism 791 has a reflective surface.
An effective radius of an object-side surface of the object-side prism 791 (Surface 1) is 2.150 mm.
An effective radius of the image-side surface 752 (Surface 13) is 1.480 mm.

TABLE 14

Aspheric Coefficients

| Surface # | 4 | 5 | 6 | 7 | 8 |
|---|---|---|---|---|---|
| k= | −1.1539E−02 | 4.0906E+00 | −1.6303E−01 | −2.0382E−01 | −1.4090E−01 |
| A4= | −6.2727E−03 | 5.1584E−02 | 2.0292E−01 | −2.7941E−02 | −1.8640E−01 |
| A6= | −2.2886E−03 | −2.5462E−02 | −1.5440E−01 | 2.0421E−01 | 2.5653E−01 |
| A8= | −4.5969E−04 | −4.3351E−03 | 8.3841E−02 | −3.5376E−01 | −3.1616E−01 |
| A10= | −3.5255E−05 | 5.7551E−03 | −3.1251E−02 | 3.1018E−01 | 2.2398E−01 |
| A12= | −9.1778E−05 | −1.6913E−03 | 6.5926E−03 | −1.2965E−01 | −7.3636E−02 |
| A14= | — | 1.8589E−04 | −5.6079E−04 | 1.9736E−02 | 8.1864E−03 |

| Surface # | 9 | 10 | 11 | 12 | 13 |
|---|---|---|---|---|---|
| k= | 1.6628E+00 | −1.1262E−01 | −5.2455E−01 | 3.5282E+01 | −9.0000E+01 |
| A4= | −3.9517E−02 | 1.5157E−01 | 1.2044E−01 | −1.2267E−01 | −1.0037E−01 |
| A6= | 2.6590E−02 | 1.9259E−02 | 5.1338E−02 | 5.1687E−02 | 3.1136E−02 |
| A8= | −6.4304E−02 | −1.4437E−01 | −1.0774E−01 | −4.6477E−02 | −1.4939E−02 |
| A10= | 4.1599E−02 | 1.4478E−01 | 1.1552E−01 | 4.0035E−02 | 3.7773E−03 |
| A12= | 4.7085E−03 | −5.6801E−02 | −6.2406E−02 | −2.1902E−02 | −4.6775E−04 |
| A14= | −5.7766E−03 | 5.1333E−03 | 1.3140E−02 | 5.8309E−03 | −6.6419E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 8.82 | f/f2 | −4.56 |
| Fno | 2.82 | f3/f1 | 0.84 |
| HFOV [deg.] | 15.7 | (f/f1) − (f/f2) + (f/f3) | 10.33 |
| (V2 + V3 + V4 + V5)/V1 | 2.19 | BL/ImgH | 1.78 |
| CT1/CT2 | 2.90 | BL/TD | 1.05 |
| T34/T45 | 1.10 | SD/TD | 0.87 |
| ΣAT/CT1 | 0.87 | ImgH/f | 0.29 |
| ΣAT/ΣCT | 0.28 | EPD/ImgH | 1.24 |
| R1/R5 | 1.30 | TL/f | 0.99 |
| R1/R7 | −1.19 | Y11/Y52 | 1.06 |
| R5/f | 0.19 | Yc42/CT4 | 2.49 |
| (R3 + R4)/(R3 − R4) | 0.16 | — | — |

8th Embodiment

Figure 15:
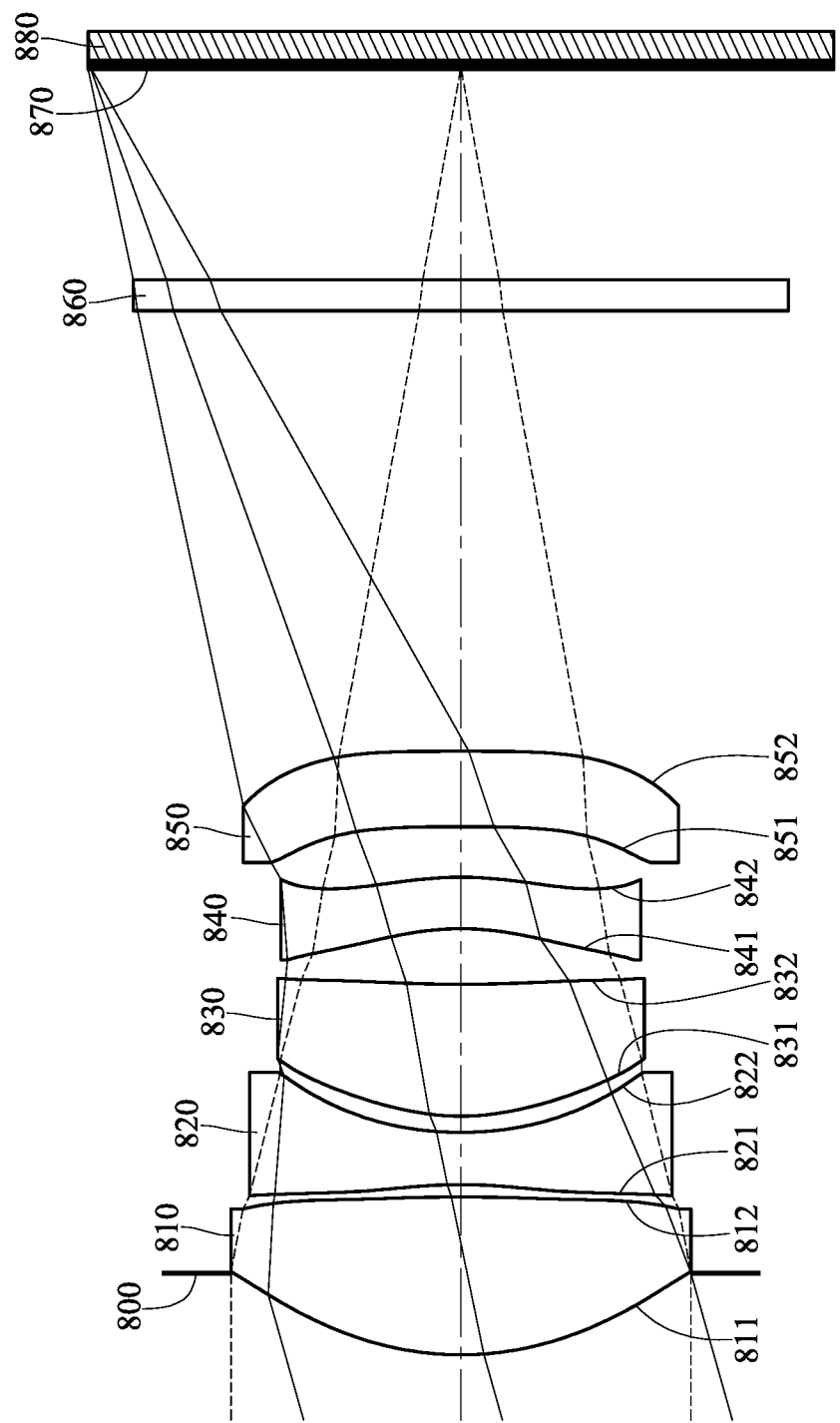
FIG. 15 a schematic view of an image capturing unit according to the 8th embodiment of the present disclosure.
Figure 16:
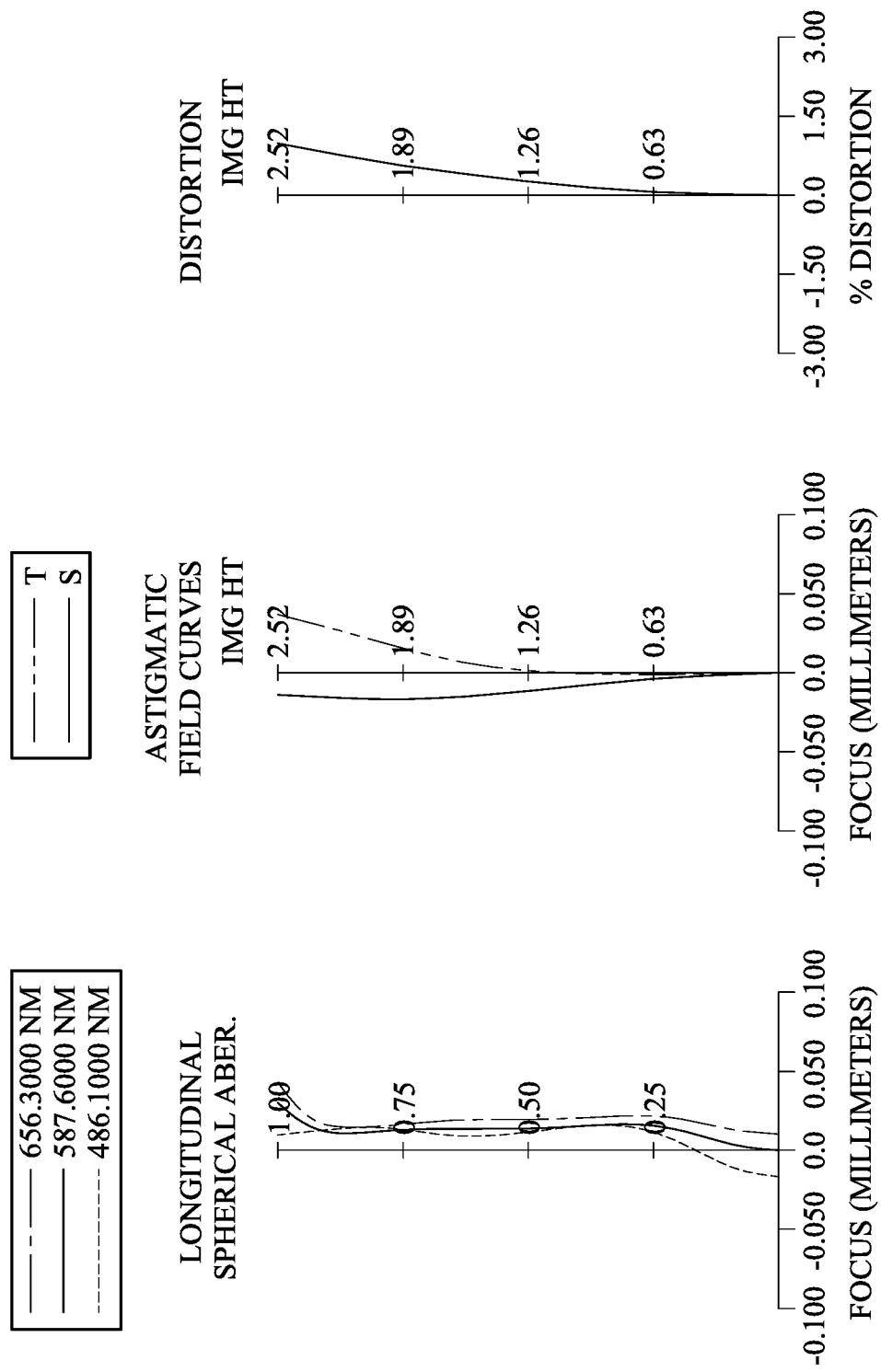
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 880. The photographing lens assembly includes, in order from an object side to an image side, an aperture stop 800, a first lens element 810, a second lens element 820, a third lens element 830, a fourth lens element 840, a fifth lens element 850, an IR-cut filter 860 and an image surface 870. The photographing lens assembly includes five lens elements (810-850) with no additional lens element disposed between the first lens element 810 and the fifth lens element 850.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric. Both the object-side surface 811 and the image-side surface 812 of the first lens element 810 have at least one inflection point.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. Both the object-side surface 821 and the image-side surface 822 of the second lens element 820 have at least one inflection point.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has at least one inflection point.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. The image-side surface 842 of the fourth lens element 840 has at least one concave critical point in an off-axial region thereof.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point.

The IR-cut filter 860 is made of glass material and located between the fifth lens element 850 and the image surface 870, and will not affect the focal length of the photographing lens assembly. The image sensor 880 is disposed on or near the image surface 870 of the photographing lens assembly.

The detailed optical data of the 8th embodiment are shown in Table 15 and the aspheric surface data are shown in Table 16 below.

TABLE 15

8th Embodiment
f = 8.83 mm, Fno = 2.82, HFOV = 15.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.555 | | | | |
| 2 | Lens 1 | 2.136 | (ASP) | 1.075 | Plastic | 1.545 | 56.1 | 3.38 |
| 3 | | −10.895 | (ASP) | 0.084 | | | | |
| 4 | Lens 2 | −3.033 | (ASP) | 0.355 | Plastic | 1.639 | 23.3 | −1.97 |
| 5 | | 2.255 | (ASP) | 0.111 | | | | |
| 6 | Lens 3 | 1.617 | (ASP) | 0.898 | Plastic | 1.660 | 20.4 | 2.89 |
| 7 | | 8.356 | (ASP) | 0.379 | | | | |
| 8 | Lens 4 | −1.817 | (ASP) | 0.350 | Plastic | 1.639 | 23.3 | −13.23 |
| 9 | | −2.488 | (ASP) | 0.344 | | | | |
| 10 | Lens 5 | −28.665 | (ASP) | 0.514 | Plastic | 1.544 | 56.0 | −61.57 |
| 11 | | −200.000 | (ASP) | 3.000 | | | | |
| 12 | IR-cut filter | Plano | | 0.210 | Glass | 1.517 | 64.2 | — |
| 13 | | Plano | | 1.432 | | | | |
| 14 | Image | Plano | | — | | | | |

Note:
Reference wavelength is 587.6 nm (d-line).
An effective radius of the image-side surface 852 (Surface 11) is 1.480 mm.

TABLE 16

Aspheric Coefficients

| Surface # | 2 | 3 | 4 | 5 | 6 |
|---|---|---|---|---|---|
| k= | −2.0528E−02 | 1.0434E+01 | −2.3480E−01 | −2.9718E−01 | −1.8572E−01 |
| A4= | −8.7993E−03 | 1.5432E−02 | 1.9414E−01 | −2.9079E−03 | −1.9104E−01 |
| A6= | −4.6072E−05 | 6.2667E−02 | −1.1315E−01 | 1.7896E−01 | 2.7912E−01 |
| A8= | −1.3934E−03 | −9.3342E−02 | 2.9973E−02 | −3.7379E−01 | −3.6288E−01 |
| A10= | 2.5550E−04 | 5.1031E−02 | 3.0548E−02 | 3.4535E−01 | 2.6191E−01 |
| A12= | −1.5166E−04 | −1.3238E−02 | −2.2009E−03 | −1.4606E−01 | −8.7966E−02 |
| A14= |  | 1.3631E−03 | 3.9534E−04 | 2.2411E−02 | 1.0371E−02 |

| Surface # | 7 | 8 | 9 | 10 | 11 |
|---|---|---|---|---|---|
| k= | 8.7135E+00 | −2.1694E−01 | −5.7329E−01 | 2.2602E+01 | −9.0000E+01 |
| A4= | −5.7164E−02 | 1.1527E−01 | 1.0059E−01 | −1.1476E−01 | −9.2745E−02 |
| A6= | 6.6398E−02 | 1.4243E−01 | 1.1973E−01 | 5.2411E−02 | 2.5361E−02 |
| A8= | −5.5562E−02 | −2.4169E−01 | −1.5515E−01 | −4.7973E−02 | −9.2753E−03 |
| A10= | −1.8819E−02 | 1.2417E−01 | 7.0816E−02 | 2.1339E−02 | −2.6999E−03 |
| A12= | 4.7549E−02 | −4.0644E−03 | −2.1504E−03 | −6.1352E−03 | 3.1453E−03 |
| A14= | −1.5576E−02 | −1.1066E−02 | −3.7241E−03 | 2.4853E−03 | −7.7407E−04 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.83 | f/f2 | −4.47 |
| Fno | 2.82 | f3/f1 | 0.85 |
| HFOV [deg.] | 15.7 | (f/f1) − (f/f2) + (f/f3) | 10.15 |
| (V2 + V3 + V4 + V5)/V1 | 2.19 | BL/ImgH | 1.84 |
| CT1/CT2 | 3.03 | BL/TD | 1.13 |
| T34/T45 | 1.10 | SD/TD | 0.86 |
| ΣAT/CT1 | 0.85 | ImgH/f | 0.29 |
| ΣAT/ΣCT | 0.29 | EPD/ImgH | 1.24 |
| R1/R5 | 1.32 | TL/f | 0.99 |
| R1/R7 | −1.18 | Y11/Y52 | 1.06 |
| R5/f | 0.18 | Yc42/CT4 | 2.56 |
| (R3 + R4)/(R3 − R4) | 0.15 | — | — |

9th Embodiment

Figure 17:
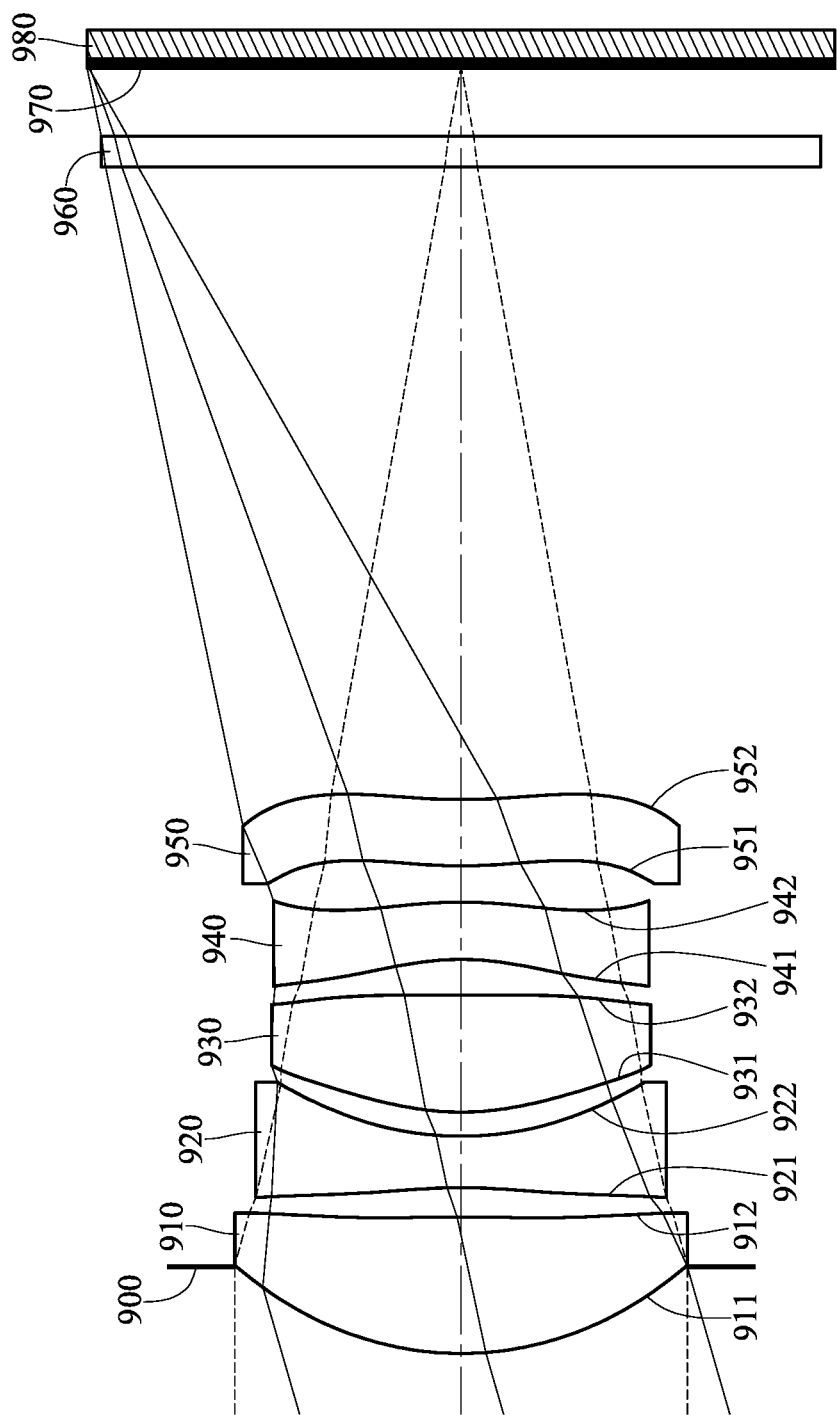
FIG. 17 a schematic view of an image capturing unit according to the 9th embodiment of the present disclosure.
Figure 18:
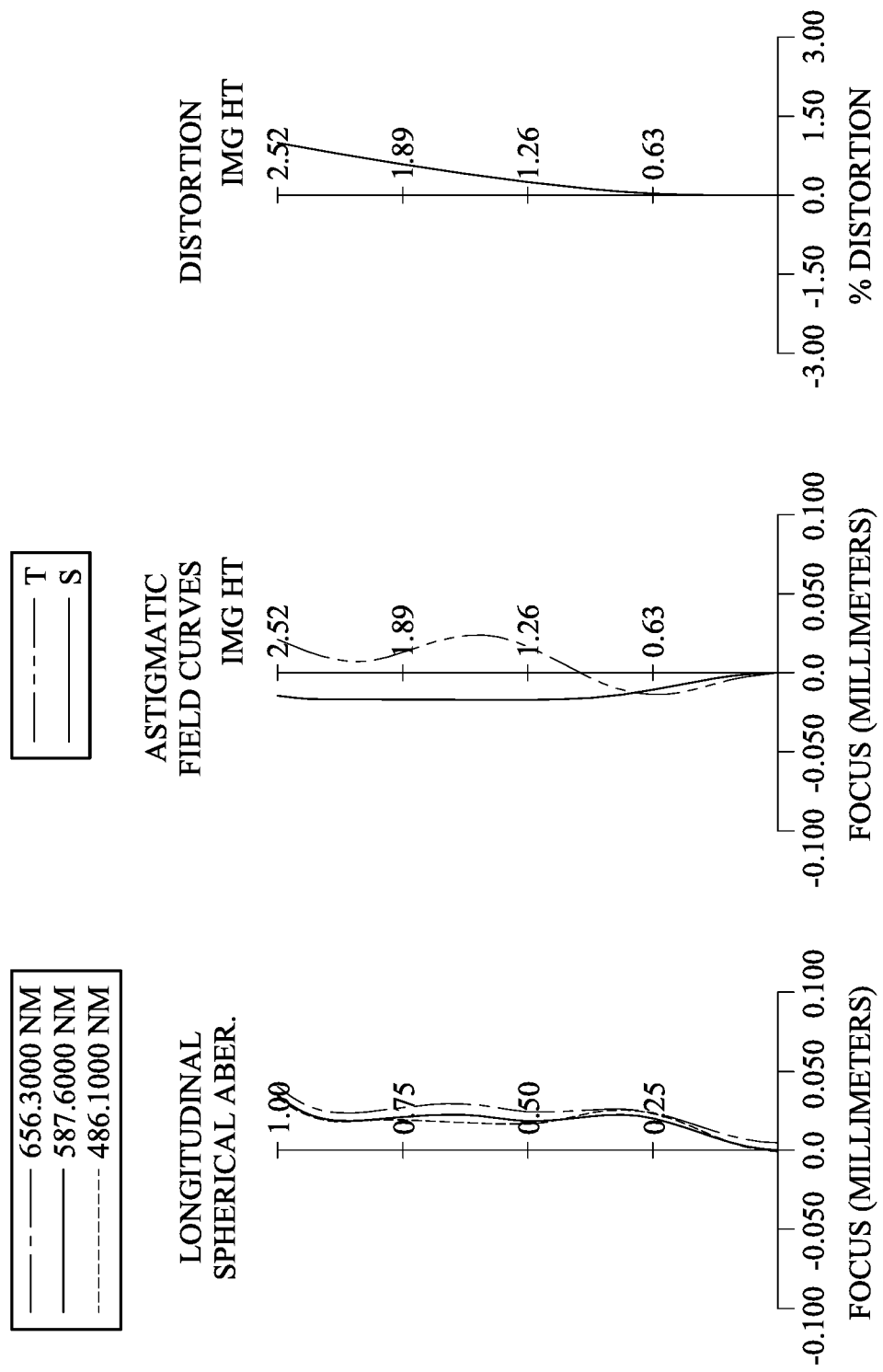
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens assembly (its reference numeral is to omitted) of the present disclosure and an image sensor 980. The photographing lens assembly includes, in order from an object side to an image side, an aperture stop 900, a first lens element 910, a second lens element 920, a third lens element 930, a fourth lens element 940, a fifth lens element 950, an IR-cut filter 960 and an image surface 970. The photographing lens assembly includes five lens elements (910-950) with no additional lens element disposed between the first lens element 910 and the fifth lens element 950.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric. The image-side surface 912 of the first lens element 910 has at least one inflection point.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has at least one inflection point.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The image-side surface 932 of the third lens element 930 has at least one inflection point.

The fourth lens element 940 with negative refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has at least one inflection point. The image-side surface 942 of the fourth lens element 940 has at least one concave shape in an off-axial region thereof. The image-side surface 942 of the fourth lens element 940 has at least one concave critical point in an off-axial region thereof.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has at least one concave shape in an off-axial region thereof. The image-side surface 952 of the fifth lens element 950 has at least one convex shape in an off-axial region thereof.

The IR-cut filter 960 is made of glass material and located between the fifth lens element 950 and the image surface 970, and will not affect the focal length of the photographing lens assembly. The image sensor 980 is disposed on or near the image surface 970 of the photographing lens assembly.

The detailed optical data of the 9th embodiment are shown in Table 17 and the aspheric surface data are shown in Table 18 below.

TABLE 17

9th Embodiment
f = 8.60 mm, Fno = 2.80, HFOV = 16.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.588 | | | | |
| 2 | Lens 1 | 2.173 | (ASP) | 0.927 | Plastic | 1.545 | 56.1 | 3.62 |
| 3 | | −18.361 | (ASP) | 0.200 | | | | |
| 4 | Lens 2 | −3.388 | (ASP) | 0.350 | Plastic | 1.639 | 23.3 | −2.14 |
| 5 | | 2.378 | (ASP) | 0.163 | | | | |
| 6 | Lens 3 | 1.853 | (ASP) | 0.795 | Plastic | 1.660 | 20.4 | 2.92 |
| 7 | | 40.696 | (ASP) | 0.243 | | | | |
| 8 | Lens 4 | −1.831 | (ASP) | 0.389 | Plastic | 1.660 | 20.4 | −8.21 |
| 9 | | −2.999 | (ASP) | 0.247 | | | | |
| 10 | Lens 5 | 3.355 | (ASP) | 0.450 | Plastic | 1.544 | 56.0 | 50.15 |
| 11 | | 3.645 | (ASP) | 4.300 | | | | |
| 12 | IR-cut filter | Plano | | 0.210 | Glass | 1.517 | 64.2 | — |
| 13 | | Plano | | 0.460 | | | | |
| 14 | Image | Plano | | — | | | | |

Note:
Reference wavelength is 587.6 nm (d-line).
An effective radius of the image-side surface 952 (Surface 11) is 1.480 mm.

TABLE 18

Aspheric Coefficients

| Surface # | 2 | 3 | 4 | 5 | 6 |
|---|---|---|---|---|---|
| k= | 1.1391E−01 | −9.0000E+01 | 5.4254E−01 | −6.9401E−01 | −1.9563E−01 |
| A4= | −9.2218E−03 | 3.3812E−02 | 2.1019E−01 | 7.8241E−02 | −1.1439E−01 |
| A6= | 7.3160E−03 | 5.4551E−02 | −1.5229E−01 | −8.8424E−02 | 4.3733E−02 |
| A8= | −6.3045E−03 | −1.0866E−01 | 3.6706E−02 | 2.5318E−02 | −7.6450E−04 |
| A10= | 2.2396E−03 | 7.5085E−02 | 1.8877E−02 | 1.1983E−02 | −3.3624E−02 |
| A12= | −3.8429E−04 | −2.4110E−02 | −1.3318E−02 | −5.8691E−03 | 2.7842E−02 |
| A14= | — | 2.9944E−03 | 2.2539E−03 | 9.7001E−05 | −6.3927E−03 |

| Surface # | 7 | 8 | 9 | 10 | 11 |
|---|---|---|---|---|---|
| k= | 8.6918E+01 | −6.3684E−01 | 2.5779E−01 | −3.4170E+01 | −4.9565E+01 |
| A4= | −6.1835E−02 | 1.7764E−01 | 1.2385E−01 | −8.9311E−02 | −4.3846E−02 |
| A6= | −2.1966E−02 | −6.2465E−02 | 6.8054E−02 | 1.2593E−02 | −5.7253E−02 |
| A8= | 1.2908E−01 | 6.9917E−02 | −1.3705E−01 | −4.3051E−02 | 6.8887E−02 |
| A10= | −1.5821E−01 | −1.0146E−01 | 1.0545E−01 | 5.5447E−02 | −4.3583E−02 |
| A12= | 8.4547E−02 | 6.3968E−02 | −4.3710E−02 | −3.3319E−02 | 1.4165E−02 |
| A14= | −1.6403E−02 | −1.4556E−02 | 8.1961E−03 | 7.5188E−03 | −1.9437E−03 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 8.60 | f/f2 | −4.02 |
| Fno | 2.80 | f3/f1 | 0.81 |
| HFOV [deg.] | 16.1 | (f/f1) − (f/f2) + (f/f3) | 9.35 |
| (V2 + V3 + V4 + V5)/V1 | 2.14 | BL/ImgH | 1.97 |
| CT1/CT2 | 2.65 | BL/TD | 1.32 |
| T34/T45 | 0.98 | SD/TD | 0.84 |
| ΣAT/CT1 | 0.92 | ImgH/f | 0.29 |
| ΣAT/ΣCT | 0.29 | EPD/ImgH | 1.22 |
| R1/R5 | 1.17 | TL/f | 1.02 |
| R1/R7 | −1.19 | Y11/Y52 | 1.04 |
| R5/f | 0.22 | Yc42/CT4 | 2.16 |
| (R3 + R4)/(R3 − R4) | 0.18 | — | — |

10th Embodiment

Figure 19:
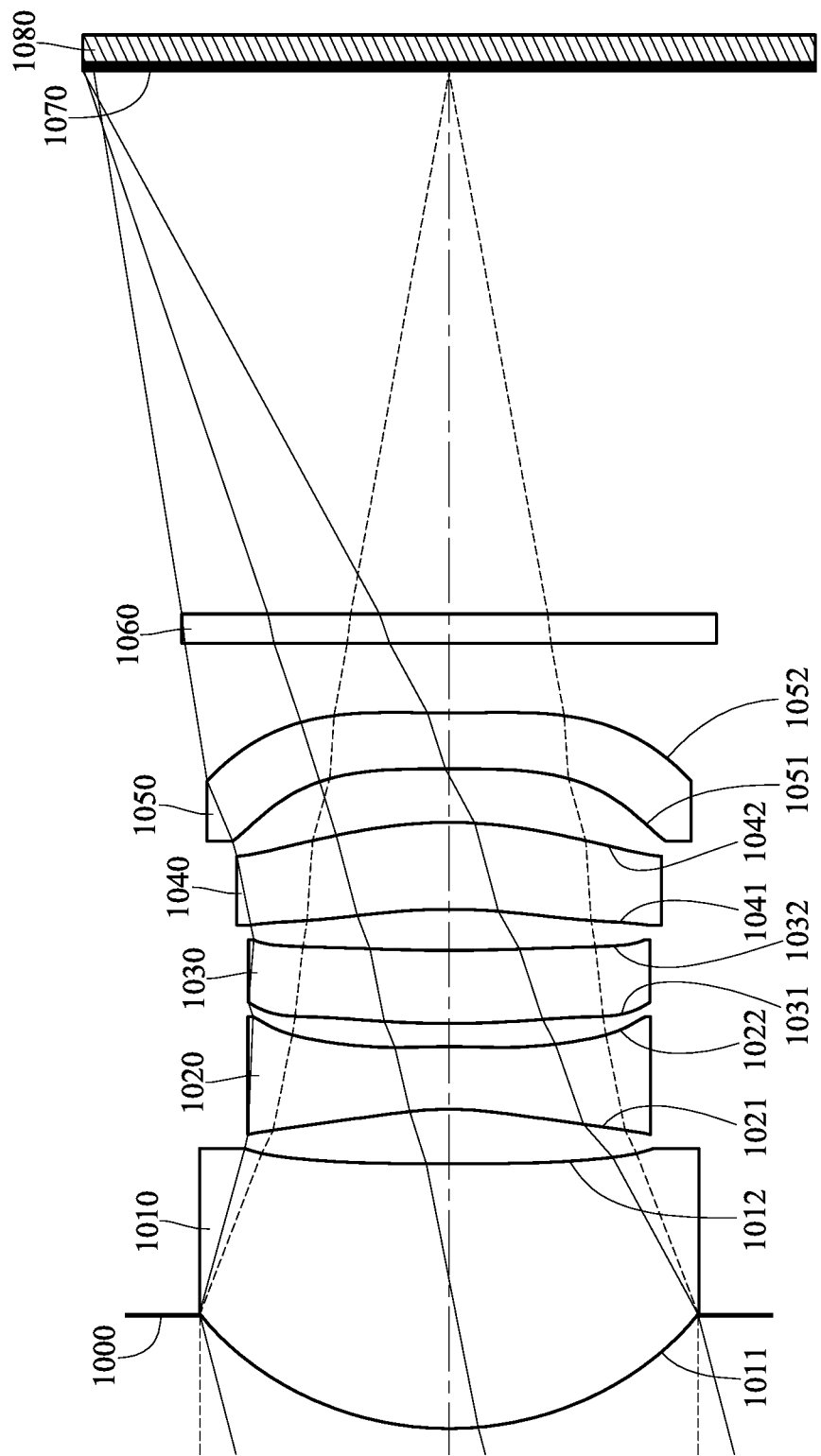
FIG. 19 a schematic view of an image capturing unit according to the 10th embodiment of the present disclosure.
Figure 20:
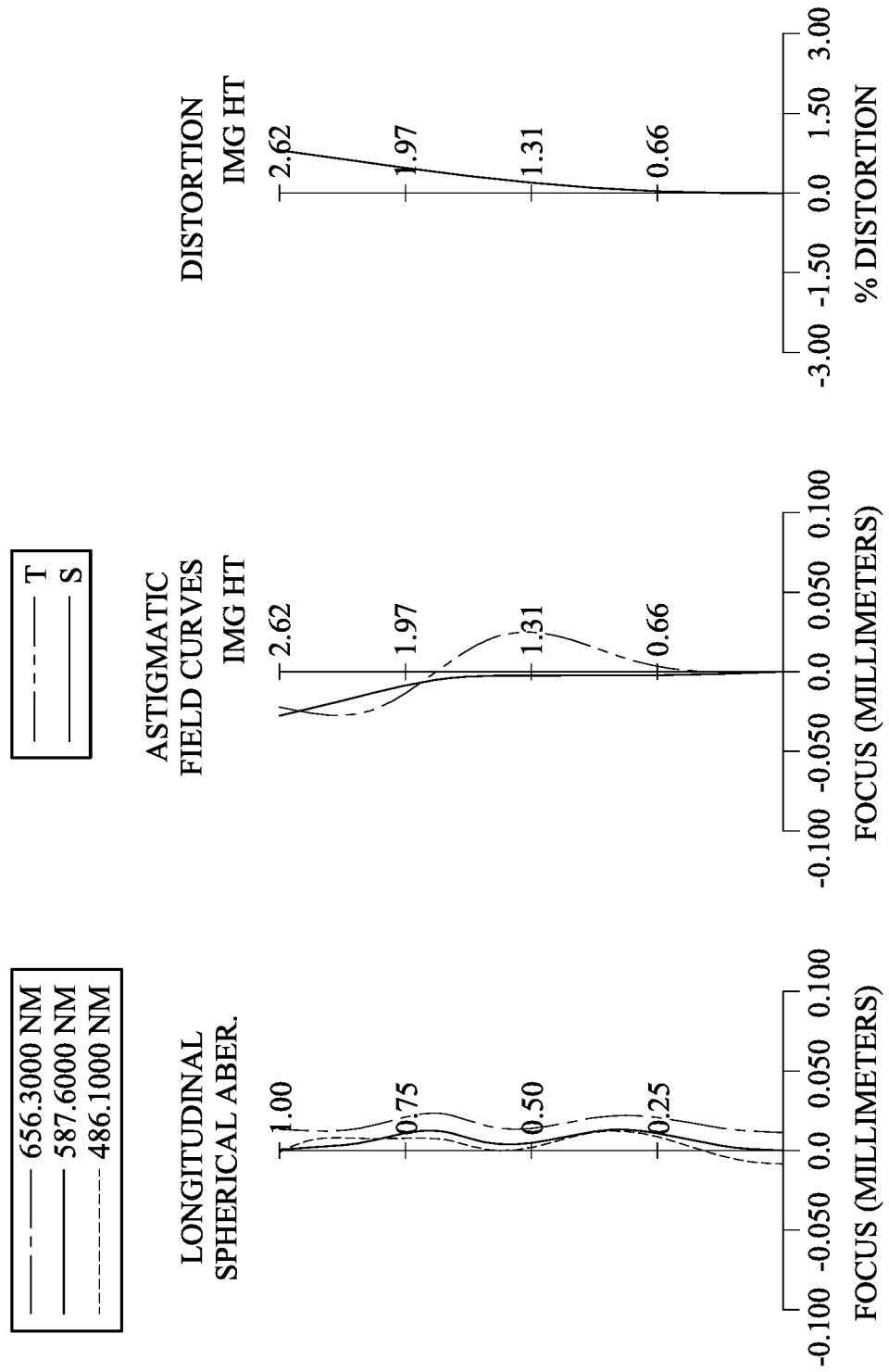
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing lens assembly (its reference numeral is omitted) of the present disclosure and an image sensor 1080. The photographing lens assembly includes, in order from an object side to an image side, an aperture stop 1000, a first lens element 1010, a second lens element 1020, a third lens element 1030, a fourth lens element 1040, a fifth lens element 1050, an IR-cut filter 1060 and an image surface 1070. The photographing lens assembly includes five lens elements (1010-1050) with no additional lens element disposed between the first lens element 1010 and the fifth lens element 1050.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The image-side surface 1012 of the first lens element 1010 has at least one inflection point.

The second lens element 1020 with negative refractive power has an object-side surface 1021 being concave in a paraxial region thereof and an image-side surface 1022 being convex in a paraxial region thereof. The second lens element 1020 is made of plastic material and has the object-side surface 1021 and the image-side surface 1022 being both aspheric. The object-side surface 1021 of the second lens element 1020 has at least one inflection point.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The image-side surface 1032 of the third lens element 1030 has at least one inflection point.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. The object-side surface 1041 of the fourth lens element 1040 has at least one inflection point. The image-side surface 1042 of the fourth lens element 1040 has at least one concave shape in an off-axial region thereof.

The fifth lens element 1050 with negative refractive power has an object-side surface 1051 being concave in a paraxial region thereof and an image-side surface 1052 being concave in a paraxial region thereof. The fifth lens element 1050 is made of plastic material and has the object-side surface 1051 and the image-side surface 1052 being both aspheric. Both the object-side surface 1051 and the image-side surface 1052 of the fifth lens element 1050 have at least one inflection point. The image-side surface 1052 of the fifth lens element 1050 has at least one convex shape in an off-axial region thereof.

The IR-cut filter 1060 is made of glass material and located between the fifth lens element 1050 and the image surface 1070, and will not affect the focal length of the photographing lens assembly. The image sensor 1080 is disposed on or near the image surface 1070 of the photographing lens assembly.

The detailed optical data of the 10th embodiment are shown in Table 19 and the aspheric surface data are shown in Table 20 below.

TABLE 19

10th Embodiment
f = 10.01 mm, Fno = 2.80, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.815 | | | | |
| 2 | Lens 1 | 2.405 | (ASP) | 1.903 | Plastic | 1.544 | 55.9 | 4.55 |
| 3 | | 63.407 | (ASP) | 0.392 | | | | |
| 4 | Lens 2 | −2.187 | (ASP) | 0.450 | Plastic | 1.660 | 20.4 | −5.34 |
| 5 | | −6.232 | (ASP) | 0.167 | | | | |
| 6 | Lens 3 | 8.814 | (ASP) | 0.524 | Plastic | 1.660 | 20.4 | 89.43 |
| 7 | | 10.117 | (ASP) | 0.296 | | | | |
| 8 | Lens 4 | −3.943 | (ASP) | 0.625 | Plastic | 1.660 | 20.4 | 17.25 |
| 9 | | −3.113 | (ASP) | 0.385 | | | | |
| 10 | Lens 5 | −24.800 | (ASP) | 0.402 | Plastic | 1.544 | 55.9 | −17.46 |
| 11 | | 15.467 | (ASP) | 0.500 | | | | |
| 12 | IR-cut filter | Plano | | 0.210 | Glass | 1.517 | 64.2 | — |
| 13 | | Plano | | 3.903 | | | | |
| 14 | Image | Plano | | — | | | | |

Note:
Reference wavelength is 587.6 nm (d-line).

TABLE 20

Aspheric Coefficients

| Surface # | 2 | 3 | 4 | 5 | 6 |
|---|---|---|---|---|---|
| k= | 3.2931E−01 | −9.9000E+01 | −1.5280E+01 | −4.5131E+01 | 3.1079E+01 |
| A4= | −3.3078E−03 | 2.8751E−02 | 1.1172E−01 | 3.2805E−01 | 6.8893E−02 |
| A6= | 3.9220E−04 | −7.0779E−03 | −1.1320E−01 | −3.8787E−01 | −1.8128E−01 |
| A8= | −5.7668E−04 | −2.5533E−03 | 5.0277E−02 | 2.7257E−01 | 1.4620E−01 |
| A10= | 1.6076E−04 | 1.9400E−03 | −8.2251E−03 | −1.3186E−01 | −7.7637E−02 |
| A12= | −2.6087E−05 | −4.5204E−05 | −1.0095E−04 | 4.8364E−02 | 3.2177E−02 |
| A14= | — | — | — | −8.6999E−03 | −5.9694E−03 |

| Surface # | 7 | 8 | 9 | 10 | 11 |
|---|---|---|---|---|---|
| k= | 1.7379E+01 | −7.7210E+00 | −2.7995E+00 | 8.9439E+01 | 7.5141E+01 |
| A4= | −3.0538E−02 | 6.3352E−02 | 3.9864E−02 | −1.0075E−01 | −1.0859E−01 |
| A6= | −2.7964E−02 | −1.1809E−01 | −8.7797E−02 | −5.0250E−02 | 2.1072E−02 |
| A8= | 6.4881E−02 | 2.0898E−01 | 1.4042E−01 | 1.1484E−01 | 8.5198E−03 |
| A10= | −4.2528E−02 | −1.7572E−01 | −1.0773E−01 | −9.0116E−02 | −1.1484E−02 |
| A12= | 1.0035E−02 | 6.8465E−02 | 3.8697E−02 | 3.0823E−02 | 4.0352E−03 |
| A14= | — | −1.0228E−02 | −5.2074E−03 | −3.7347E−03 | −4.9313E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 10.01 | f/f2 | −1.87 |
| Fno | 2.80 | f3/f1 | 19.67 |
| HFOV [deg.] | 14.5 | (f/f1) − (f/f2) + (f/f3) | 4.19 |
| (V2 + V3 + V4 + V5)/V1 | 2.09 | BL/ImgH | 1.76 |
| CT1/CT2 | 4.23 | BL/TD | 0.90 |
| T34/T45 | 0.77 | SD/TD | 0.84 |
| ΣAT/CT1 | 0.65 | ImgH/f | 0.26 |
| ΣAT/ΣCT | 0.32 | EPD/ImgH | 1.37 |
| R1/R5 | 0.27 | TL/f | 0.97 |
| R1/R7 | −0.61 | Y11/Y52 | 1.03 |
| R5/f | 0.88 | Yc42/CT4 | — |
| (R3 + R4)/(R3 − R4) | −2.08 | — | — |

11th Embodiment

Figure 22:
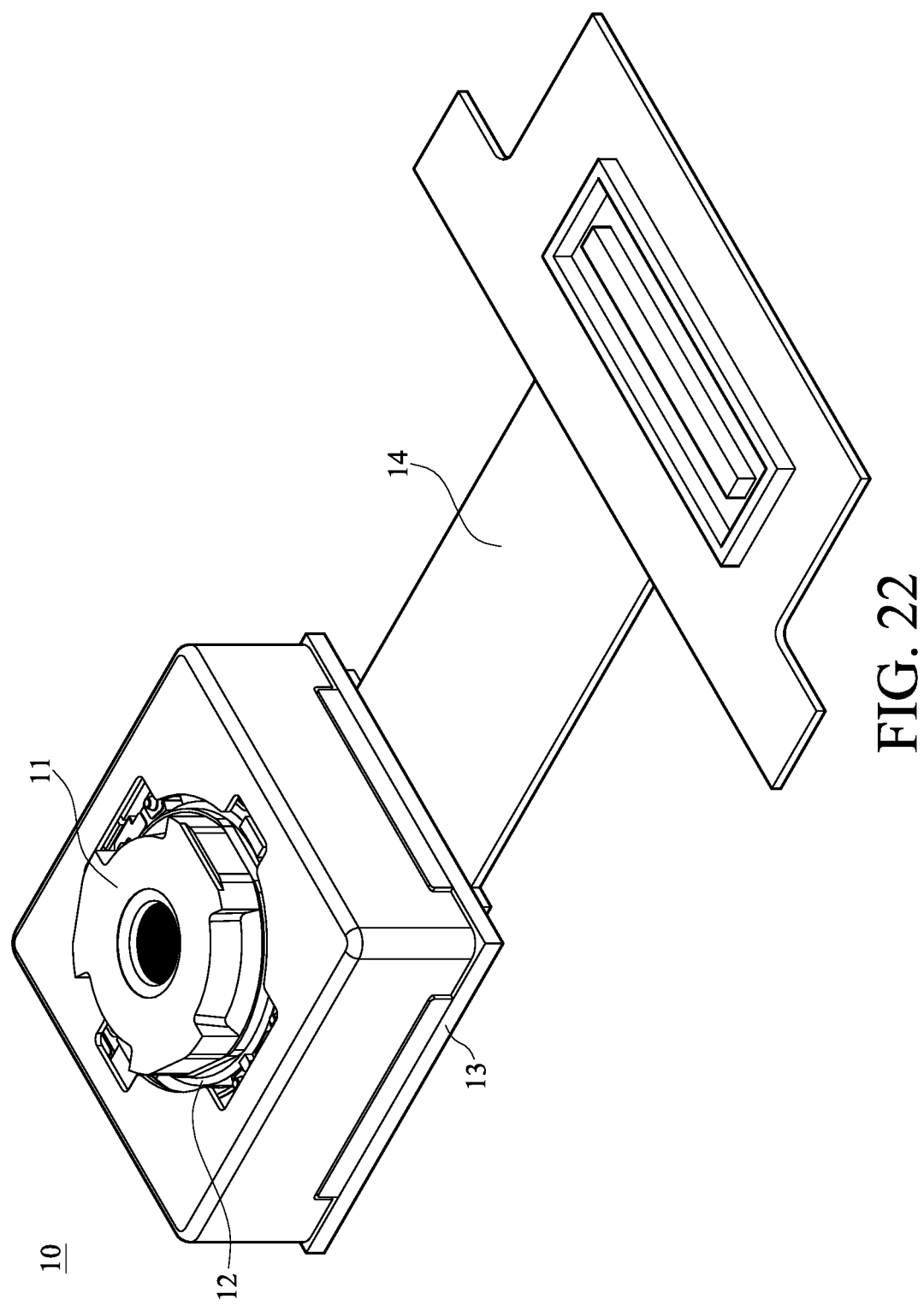
FIG. 22 is a perspective view of an image capturing unit according to the 11th embodiment of the present disclosure.

FIG. 22 is a perspective view of an image capturing unit according to the 11th embodiment of the present disclosure. In this embodiment, an image capturing unit 10 is a camera module including a lens unit 11, a driving device 12, an image sensor 13 and a cable 14. The lens unit 11 includes the photographing lens assembly disclosed in the first embodiment, a barrel and a holder member (their reference numerals are omitted) for holding the photographing lens assembly. The external light converges into the lens unit 11 of the image capturing unit 10 to generate an image, and the lens unit 11 along with the driving device 12 is utilized for image focusing on the image sensor 13. Then, the image is digitally transmitted to an electronic component by the cable 14.

The driving device 12 can have auto focusing functionality, and different driving configurations can be through the use of voice coil motors (VCM), micro electro-mechanical systems (MEMS), piezoelectric systems, or shape memory alloy materials. The driving device 12 is favorable for the lens unit 11 to obtain a better imaging position, so that a clear image of the imaged object can be captured by the lens unit 11 with different object distances. The image sensor 13 (for example, CCD or CMOS) can be featured with high photosensitivity and low noise, disposed on the image surface of the photographing lens assembly to provide higher image quality.

There can be a dynamic sensing element 26, such as an accelerometer, a gyroscope and a hall effect sensor, configured to work with the driving device 12 (Please refer to FIG. 23), so that the driving device 12 can provide optical image stabilization (OIS). The driving device 12 working with the dynamic sensing element 26 is favorable for compensating for pan and tilt of the lens unit 11 to reduce blurring associated with motion during exposure. In some cases, the driving device 12 can be can be assisted by electronic image stabilization (EIS) with image processing software, thereby improving image quality while in motion or low-light condition.

12th Embodiment

Figure 23:
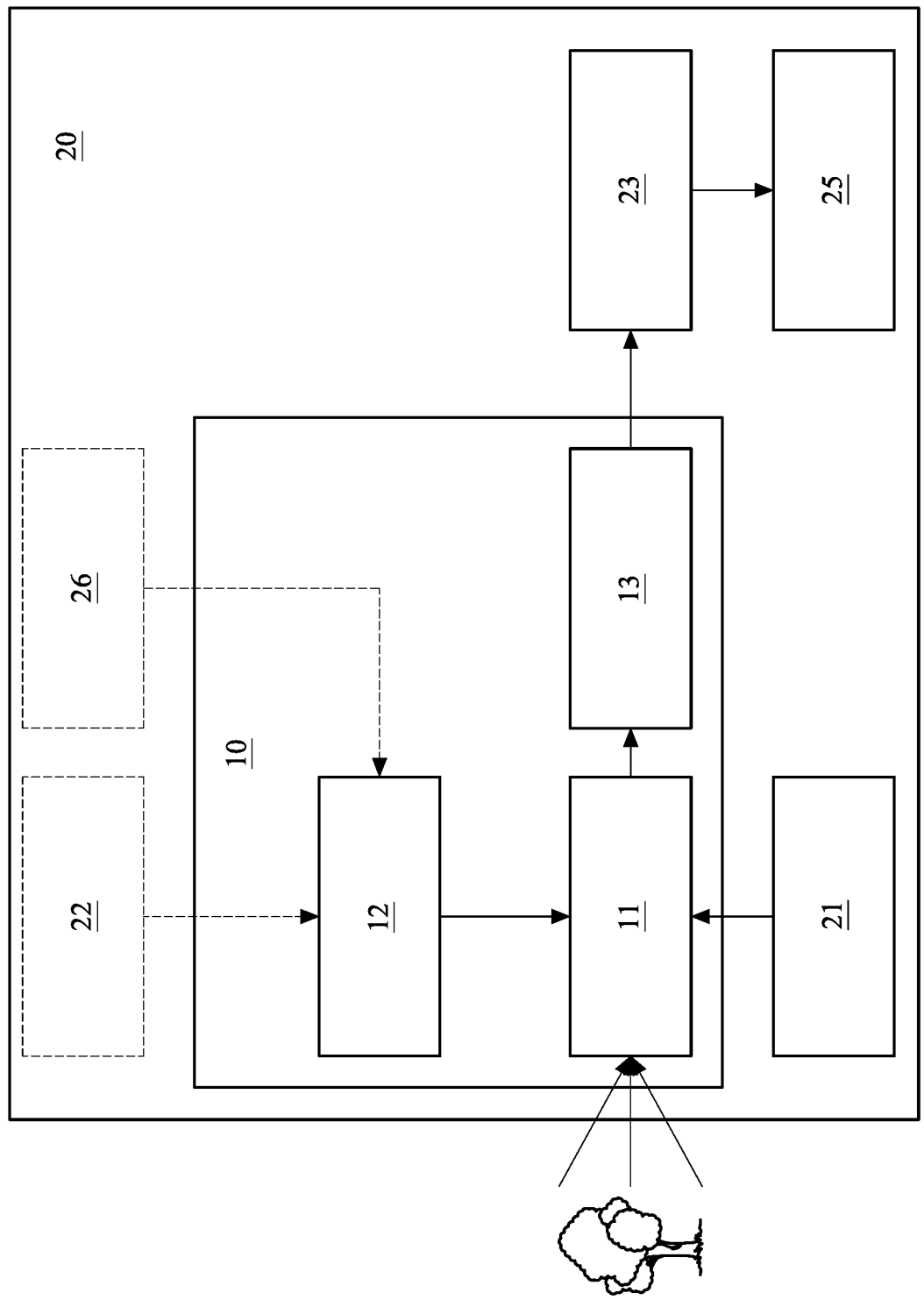
FIG. 23 is a schematic view of an electronic device according to the 12th embodiment of the present disclosure.
Figure 24:
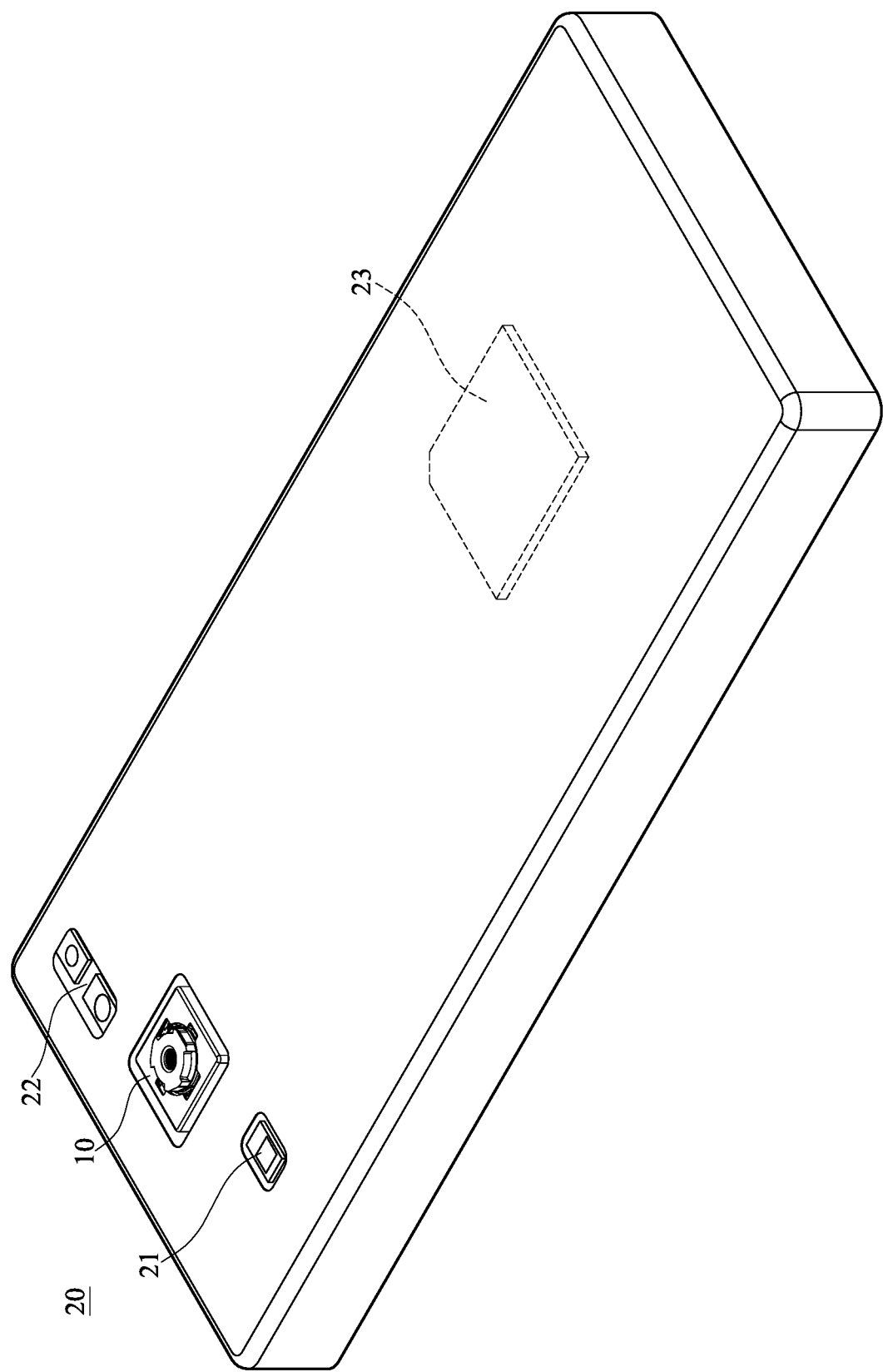
FIG. 24 is a perspective view of the electronic device in FIG. 23.
Figure 25:
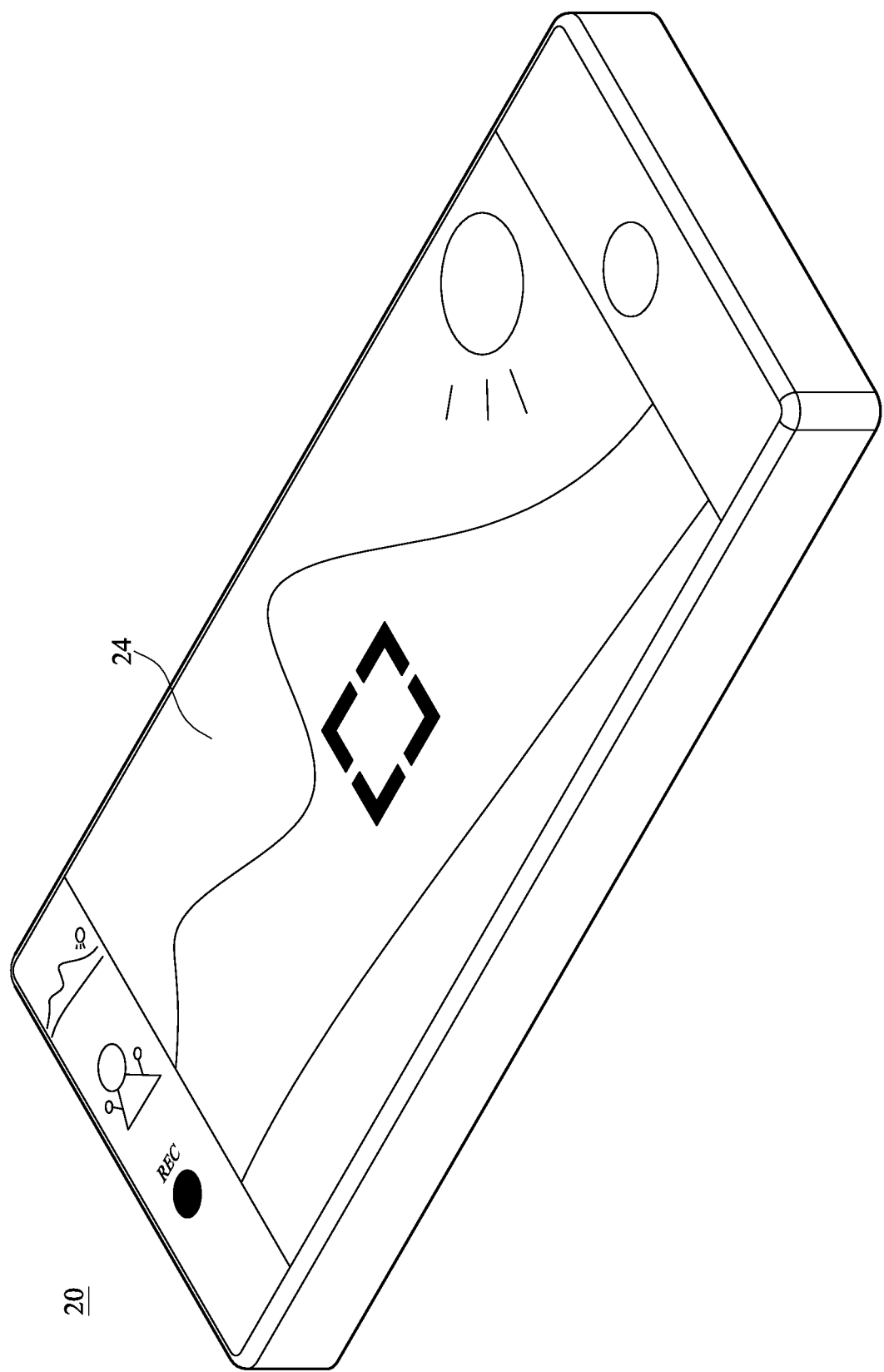
FIG. 25 is another perspective view of the electronic device in FIG. 23.

FIG. 23 is a schematic view of an electronic device according to the 12th embodiment of the present disclosure. FIG. 24 is a perspective view of the electronic device in FIG. 23. FIG. 25 is another perspective view of the electronic device in FIG. 23. In this embodiment, an electronic device 20 is a smart phone including the image capturing unit 10 disclosed in the eleventh embodiment, a flash light module 21, a focus assist module 22, an image signal processor 23, an user interface 24, an image software processor 25 and a dynamic sensing element 26.

When a user interacts with the user interface 24 to capture images, light converges into the image capturing unit 10 to generate image, and the flash light module 21 is activated for light supplement. The focus assist module 22 detects the object distance of the imaged object to achieve fast image auto focus. The image signal processor 23 is configured to optimize the captured image to improve image quality. The light beam emitted from focus assist module 22 can be either infrared light or laser. The user interface 24 can be a touch screen or a shutter button. The user is able to interact with the user interface 24 and the image software processor 25 having multiple functions to capture images and complete image processing.

The smart phone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing lens assembly of the image capturing unit 10 is featured with good capability in aberration corrections and high image quality, and can be applied to 3D (three-dimensional) image capturing applications, in products such as digital cameras, mobile devices, digital tablets, wearable devices, smart televisions, multiple lens devices, network surveillance devices, motion sensing input devices, dashboard cameras, vehicle backup cameras and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising a total of five lens elements, the five lens elements being, in order from an object side to an image side, a first lens element, a second lens element, a third lens element, a fourth lens element and a fifth lens element;

wherein each of the five lens elements has an object-side surface facing toward the object side and an image-side surface facing toward the image side, the first lens element has positive refractive power, the object-side surface of the third lens element is convex in a paraxial region thereof, the image-side surface of the third lens element is concave in a paraxial region thereof, the fourth lens element has negative refractive power, the object-side surface of the fourth lens element is concave in a paraxial region thereof, at least one surface of the five lens elements has at least one inflection point, and a central thickness of the first lens element is a maximum among all central thicknesses of the five lens elements;

wherein a maximum image height of the photographing lens assembly is ImgH, a focal length of the photographing lens assembly is f, and the following condition is satisfied:

$0.10 < ImgH/f \leq 0.29$.

2. The photographing lens assembly of claim 1, wherein the fifth lens element has positive refractive power.

3. The photographing lens assembly of claim 1, wherein the image-side surface of the fourth lens element is convex in a paraxial region thereof.

4. The photographing lens assembly of claim 1, wherein the object-side surface of the fifth lens element is convex in a paraxial region thereof, and the image-side surface of the fifth lens element has at least one convex shape in an off-axial region thereof.

5. The photographing lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, and the following condition is satisfied:

$1.0 < (V2+V3+V4+V5)/V1 < 2.50$.

6. The photographing lens assembly of claim 1, wherein a maximum effective radius of the object-side surface of the first lens element is Y11, a maximum effective radius of the image-side surface of the fifth lens element is Y52, and the following condition is satisfied:

$0.95 < Y11/Y52 < 1.30$.

7. The photographing lens assembly of claim 1, wherein a curvature radius of the object-side surface of the first lens element is R1, a curvature radius of the object-side surface of the third lens element is R5, a curvature radius of the object-side surface of the fourth lens element is R7, the focal length of the photographing lens assembly is f, and the following conditions are satisfied:

$0 < R5/f < 0.90$; and $-3.0 < R1/R7 < 1.30$.

8. The photographing lens assembly of claim 1, wherein an entrance pupil diameter of the photographing lens assembly is EPD, the maximum image height of the photographing lens assembly is ImgH, and the following condition is satisfied:

$1.0 < EPD/ImgH < 1.80$.

9. The photographing lens assembly of claim 1, wherein there are at least three of the five lens elements with an Abbe number smaller than 30.0.

10. The photographing lens assembly of claim 1, further comprising a reflective surface.

11. An image capturing unit, comprising:
the photographing lens assembly of claim 1; and
an image sensor, wherein the image sensor is disposed on an image surface of the photographing lens assembly.

12. An electronic device, comprising:
the image capturing unit of claim 11.

* * * * *